US012409670B2

(12) United States Patent
Ito et al.

(10) Patent No.: US 12,409,670 B2
(45) Date of Patent: Sep. 9, 2025

(54) PRINTING APPARATUS AND CONTROL METHOD THEREOF, AND STORAGE MEDIUM

(71) Applicant: CANON KABUSHIKI KAISHA, Tokyo (JP)

(72) Inventors: Masashi Ito, Tokyo (JP); Keisuke Arita, Kanagawa (JP); Kento Tamari, Saitama (JP); Motoyuki Taguchi, Tokyo (JP); Sho Takahashi, Kanagawa (JP); Ryota Komatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 18/122,336

(22) Filed: Mar. 16, 2023

(65) Prior Publication Data

US 2023/0311543 A1 Oct. 5, 2023

(30) Foreign Application Priority Data

Mar. 17, 2022 (JP) ................................ 2022-042782

(51) Int. Cl.
*B41J 11/42* (2006.01)

(52) U.S. Cl.
CPC .................................... *B41J 11/42* (2013.01)

(58) Field of Classification Search
CPC .... B41J 11/42; B41J 11/0095; B41J 13/0018; B41J 13/0045
See application file for complete search history.

(56) References Cited

U.S. PATENT DOCUMENTS

| | | | |
|---|---|---|---|
| 9,333,773 | B2 | 5/2016 | Taniguchi et al. |
| 9,370,946 | B2 | 6/2016 | Nishida et al. |
| 9,443,173 | B2 | 9/2016 | Taguchi et al. |
| 9,586,780 | B2 | 3/2017 | Nishida et al. |
| 9,864,937 | B2 | 1/2018 | Saito |
| 9,944,090 | B2 | 4/2018 | Nishida |

(Continued)

FOREIGN PATENT DOCUMENTS

| | | |
|---|---|---|
| EP | 2 918 527 A2 | 9/2015 |
| JP | 06-56299 A | 3/1994 |

(Continued)

OTHER PUBLICATIONS

U.S. Appl. No. 18/122,348, Noriyuki Sugiyama, filed Mar. 16, 2023.

(Continued)

*Primary Examiner* — Justin Seo
(74) *Attorney, Agent, or Firm* — Venable LLP

(57) ABSTRACT

A printing apparatus comprises a supply unit configured to supply a print medium, a roller configured to transport the print medium, a printing unit configured to print on the print medium, and a control unit capable of controlling the supply unit and the roller to create a state of overlap in which a leading end part of a following print medium overlaps a following end part of a preceding print medium on an upstream side of the first roller with respect to the transport direction of the print medium. The control unit adjusts an overlap amount in the state of overlap on the upstream side of the first roller in the transport direction of the print medium based on print data for the preceding print medium and print data for the following print medium.

15 Claims, 28 Drawing Sheets

(56) References Cited

U.S. PATENT DOCUMENTS

| | | | |
|---|---|---|---|
| 10,447,875 B2 | 10/2019 | Suzuki et al. | |
| 10,549,553 B2 | 2/2020 | Ito | |
| 11,167,945 B2 | 11/2021 | Matsuura et al. | |
| 2001/0033050 A1* | 10/2001 | Kinoshita | B41J 13/0027 271/3.17 |
| 2006/0268090 A1 | 11/2006 | Choo et al. | |
| 2011/0279876 A1 | 11/2011 | Okano | |
| 2014/0265106 A1 | 9/2014 | Saitoh et al. | |
| 2015/0103112 A1 | 4/2015 | Lo et al. | |
| 2020/0024092 A1 | 1/2020 | Taniguchi | |
| 2021/0300701 A1* | 9/2021 | Ichikawa | B65H 3/68 |

FOREIGN PATENT DOCUMENTS

| | | |
|---|---|---|
| JP | 2002-160849 A | 6/2002 |
| JP | 2003-237981 A | 8/2003 |
| JP | 2016-044058 A | 4/2016 |
| JP | 2016-215451 A | 12/2016 |
| JP | 2017-052614 A | 3/2017 |
| JP | 2018-167531 A | 11/2018 |

OTHER PUBLICATIONS

Extended European Search Report dated Jul. 21, 2023, in European Application No. 23159409.4.

U.S. Appl. No. 18/138,983, Junichi Kubokawa Masaaki Matsuura, Haruo;Uchida Shoichi Kan Takaaki Ishida Keisei Hakamata Noriyuki Sugiyama Motoyuki Taguchi Takahiro Kiuchi Yasunori Matsumoto Yumi;Mukoyama Kyosuke Kamishima, filed Apr. 25, 2023.

Office Action dated Mar. 15, 2024, in Japanese Patent Application No. 2022-042782.

* cited by examiner

FIG. 4

| PRINTING SEQUENCE N | PAGE K | M-th PRINT MEDIUM | FRONT AND BACK F | FEED SOURCE Q | PROCESSING G AFTER PRINTING |
|---|---|---|---|---|---|
| 1 | 2 | 1 | BACK (SECOND SURFACE) | PAPER LOADING UNIT | REVERSING |
| 2 | 4 | 2 | BACK (SECOND SURFACE) | PAPER LOADING UNIT | REVERSING |
| 3 | 1 | 1 | FRONT (FIRST SURFACE) | SECOND TRANSPORT PATH | DISCHARGE |
| 4 | 3 | 2 | FRONT (FIRST SURFACE) | SECOND TRANSPORT PATH | DISCHARGE |

PRINTING APPARATUS AND CONTROL METHOD THEREOF, AND STORAGE MEDIUM

BACKGROUND OF THE INVENTION

Field of the Invention

The present invention relates to a printing apparatus capable of double-sided printing by automatically reversing a print medium from a first surface to a second surface.

Description of the Related Art

In a printing apparatus capable of double-sided printing by automatically reversing a print medium from a first surface to a second surface, after transporting print media to a printing area opposite a print head with parts of the print media overlapping each other and printing onto the print media, it is necessary to cancel the state of overlap to facilitate discharging of the print media, prevent paper jams, and the like.

Japanese Patent Laid-Open No. 6-56299 describes a printing apparatus in which, after an overlapping part of print media in which a following end part and a leading end part partially overlap has passed an image forming unit, the transport speed of the preceding print medium is increased to separate that print medium from the following print medium such that the state of overlap is canceled.

However, with the apparatus described in Japanese Patent Laid-Open No. 6-56299, when increasing the transport speed of the preceding print medium to separate that print medium from the following print medium such that the state of overlap is canceled, it is necessary, depending on the dimensions of the transport path, to separate the preceding print medium at a very high speed. In such a case, the transport units, drive units, and the like that perform the separation operations are driven at high speeds, which risks increasing noise, power consumption, and the like.

SUMMARY OF THE INVENTION

Having been conceived in light of the above-described issue, the present invention provides a printing apparatus capable of suppressing an increase in noise, power consumption, and the like when canceling a state of overlap of print media.

According to a first aspect of the present invention, there is provided a printing apparatus comprising: a supply unit configured to supply a print medium; a first roller configured to transport the print medium, supplied by the supply unit, in a transport direction; a printing unit configured to print onto the print medium transported by the first roller; and a control unit capable of controlling the supply unit and the first roller to create a state of overlap in which a leading end part of a following print medium overlaps a following end part of a preceding print medium on an upstream side of the first roller in the transport direction of the print medium, wherein the control unit adjusts an overlap amount in the state of overlap on the upstream side of the first roller in the transport direction of the print medium based on print data for the preceding print medium and print data for the following print medium.

According to a second aspect of the present invention, there is provided a method of controlling a printing apparatus, the printing apparatus including a supply unit configured to supply a print medium, a first roller configured to transport the print medium, supplied by the supply unit, in a transport direction, and a printing unit configured to print onto the print medium transported by the first roller, the method comprising: controlling the supply unit and the first roller to create a state of overlap in which a leading end part of a following print medium overlaps a following end part of a preceding print medium on an upstream side of the first roller in the transport direction of the print medium, wherein in the controlling, an overlap amount in the state of overlap is adjusted on the upstream side of the first roller in the transport direction of the print medium based on print data for the preceding print medium and print data for the following print medium.

Further features of the present invention will become apparent from the following description of exemplary embodiments with reference to the attached drawings.

BRIEF DESCRIPTION OF THE DRAWINGS

FIG. 4 is a table illustrating a printing sequence according to the first embodiment.

DESCRIPTION OF THE EMBODIMENTS

Figure 1:
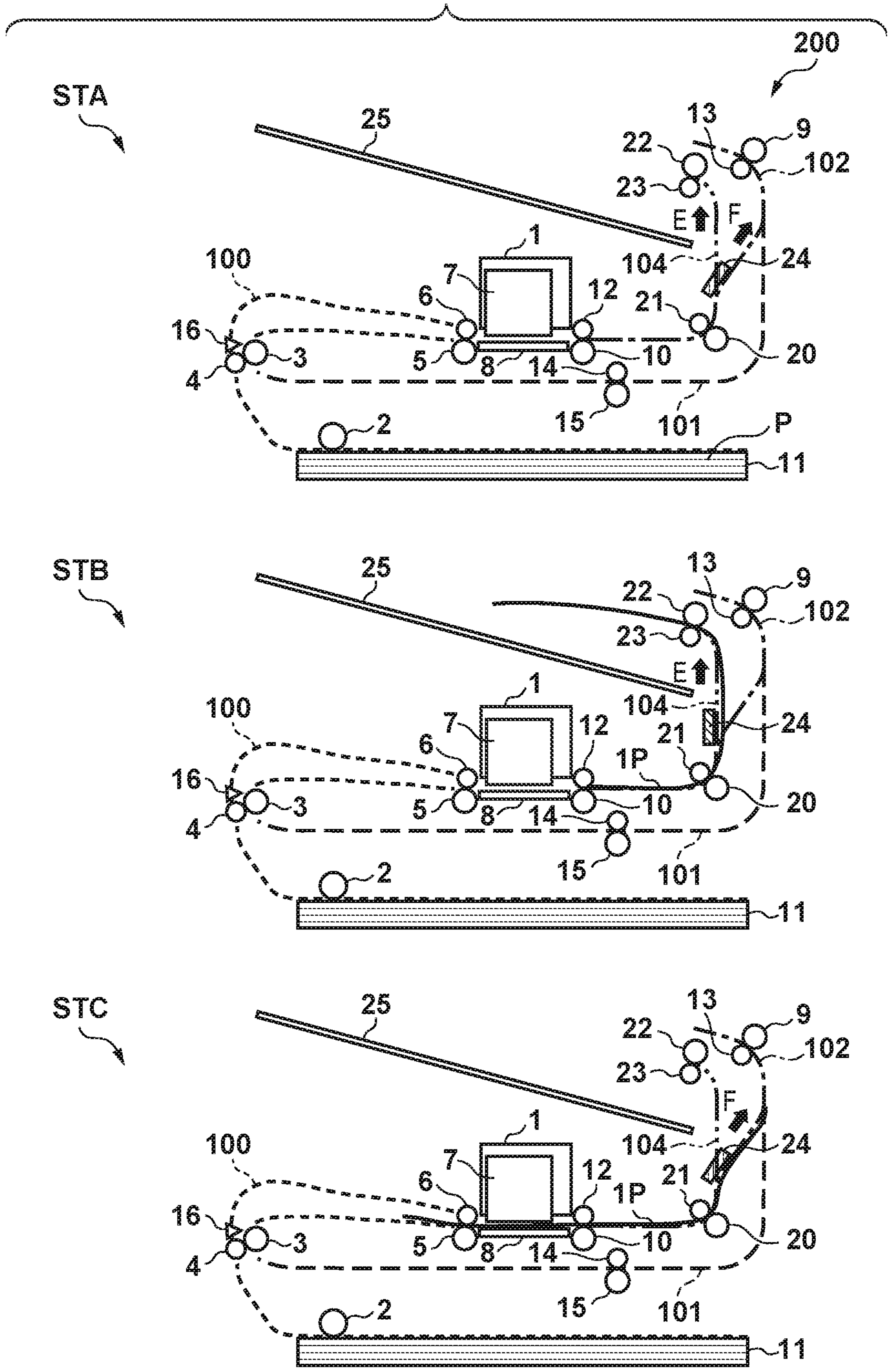
FIG. 1 is a cross-sectional view illustrating the main parts of a printing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Figure 2:
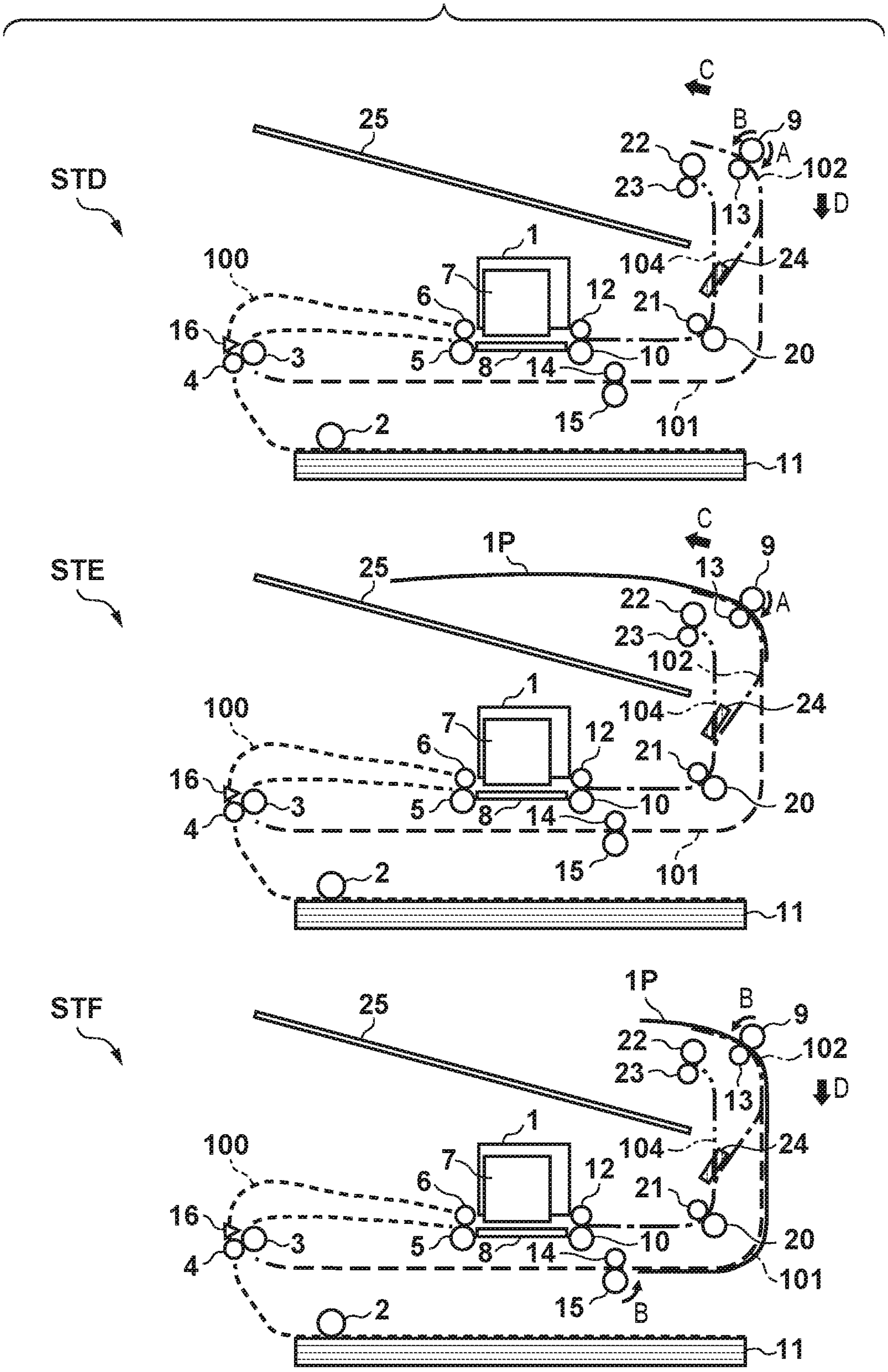
FIG. 2 is a cross-sectional view illustrating the main parts of the printing apparatus according to the first embodiment of the present invention.

FIGS. 1 and 2 are cross-sectional views illustrating the main parts of a printing apparatus 200 according to a first embodiment of the present invention. The overall configuration of the printing apparatus 200 according to the present embodiment will be described using the drawings indicated by STA to STC in FIG. 1 and STD to STF in FIG. 2.

Overall Configuration

In STA in FIG. 1, P indicates a print medium. A plurality of sheets of the print medium P are loaded in a paper loading unit 11. 2 indicates a pickup roller which makes contact with the topmost print medium P loaded in the paper loading unit 11 to pick up that print medium. 3 indicates a feed roller for feeding the print medium P picked up by the pickup roller 2 downstream in a transport direction along a first transport path 100. The pickup roller 2 is a one-way roller, and after the print medium P has been transported to a position beyond the feed roller 3, transport by the feed roller 3 can continue even if the pickup roller 2 is stopped. 4 indicates a feed driven roller which is biased against the feed roller 3 and feeds the print medium P by pinching the print medium P with the feed roller 3.

5 indicates a first transport roller, which transports the print medium P fed by the feed roller 3 and the feed driven roller 4 to a position opposite a print head 7. 6 indicates a pinch roller which is biased against the first transport roller 5 and which transports the print medium P by pinching the print medium P with the first transport roller 5.

The print medium P is guided by a guide within the first transport path 100 between a feed nip part formed by the feed roller 3 and the feed driven roller 4 and a transport nip part formed by the first transport roller 5 and the pinch roller 6. 16 indicates a print medium sensor for sensing the leading end and the following end of the print medium P. The print medium sensor 16 is provided downstream from the feed roller 3 in the print medium transport direction.

7 indicates the print head, which prints onto the print medium P transported by the first transport roller 5 and the pinch roller 6. The present embodiment will describe the print head as being an ink jet print head which prints onto the print medium P by ejecting ink. 8 indicates a platen that supports a second surface (a back surface) of the print medium P at a position opposite the print head 7. 1 indicates a carriage on which the print head 7 is mounted and which moves in a direction that intersects with the print medium transport direction.

10 indicates a second transport roller, which transports the print medium P printed onto by the print head 7 in the direction of a third transport roller 20. 12 indicates a spur that rotates while making contact with a printing surface of the print medium printed onto by the print head 7. Here, the spur 12 is biased toward the second transport roller 10.

20 indicates the third transport roller, which is capable of transporting the print medium P printed onto by the print head 7 in the direction of an arrow E or F in STA in FIG. 1. During transport in the direction of the arrow E, as indicated by STB in FIG. 1, a discharge roller 22 rotates along with the third transport roller 20, which makes it possible to transport the print medium P along a guide within a fourth transport path (a discharge path) 104 and discharge the print medium P to a paper discharge unit 25. As indicated by STC in FIG. 1, during transport in the direction of the arrow F, the print medium P is transported toward a reversing roller 9 along a guide within a third transport path 102. Branching in the direction of the arrow E or F is performed by a flapper 24, as indicated by STB and STC in FIG. 1. Note that 21 indicates a third transport driven roller which is biased against the third transport roller 20 and which transports the print medium P by pinching the print medium P with the third transport roller 20. 23 indicates a discharge driven roller which is biased toward the discharge roller 22 and which transports the print medium P by pinching the print medium P with the discharge roller 22.

The reversing roller 9 is a roller which is capable of rotating in the direction of the arrow A (forward rotation) in STD in FIG. 2 by a double-sided transport motor 216 (see FIG. 3) driving forward, and which can transport the print medium P, which has been printed onto by the print head 7, in the direction of the arrow C. Part of the print medium P can then be exposed to the exterior of the apparatus. Additionally, as indicated by STE in FIG. 2, the double-sided transport motor 216 drives in reverse after the print medium P is transported in the direction of the arrow C in STE in FIG. 2 and an upstream-side end part of the print medium P in the transport direction reaches the vicinity of the reversing roller 9. As a result, the reversing roller 9 rotates in the direction of the arrow B in STF in FIG. 2 (rotates in reverse), and the print medium Pis flipped and transported in the direction of the arrow D in the drawing, along a guide within a second transport path (a reversing path) 101.

At this time, as the reversing roller 9 rotates in reverse, an intermediate roller 15 also rotates in the direction of the arrow B in STF in FIG. 2 (in reverse), which transports the print medium P in the second transport path 101 toward the feed roller 3. Note that the intermediate roller 15 is a one-way roller, and can be driven and idle in the direction of the arrow B in STF of FIG. 2. 13 indicates a reversing driven roller which is biased toward the reversing roller 9 and which transports the print medium P by pinching the print medium P with the reversing roller 9. 14 indicates an intermediate driven roller which is biased toward the intermediate roller 15 and which transports the print medium P by pinching the print medium P with the intermediate roller 15.

Control Unit and Drive Allocation

Figure 3:
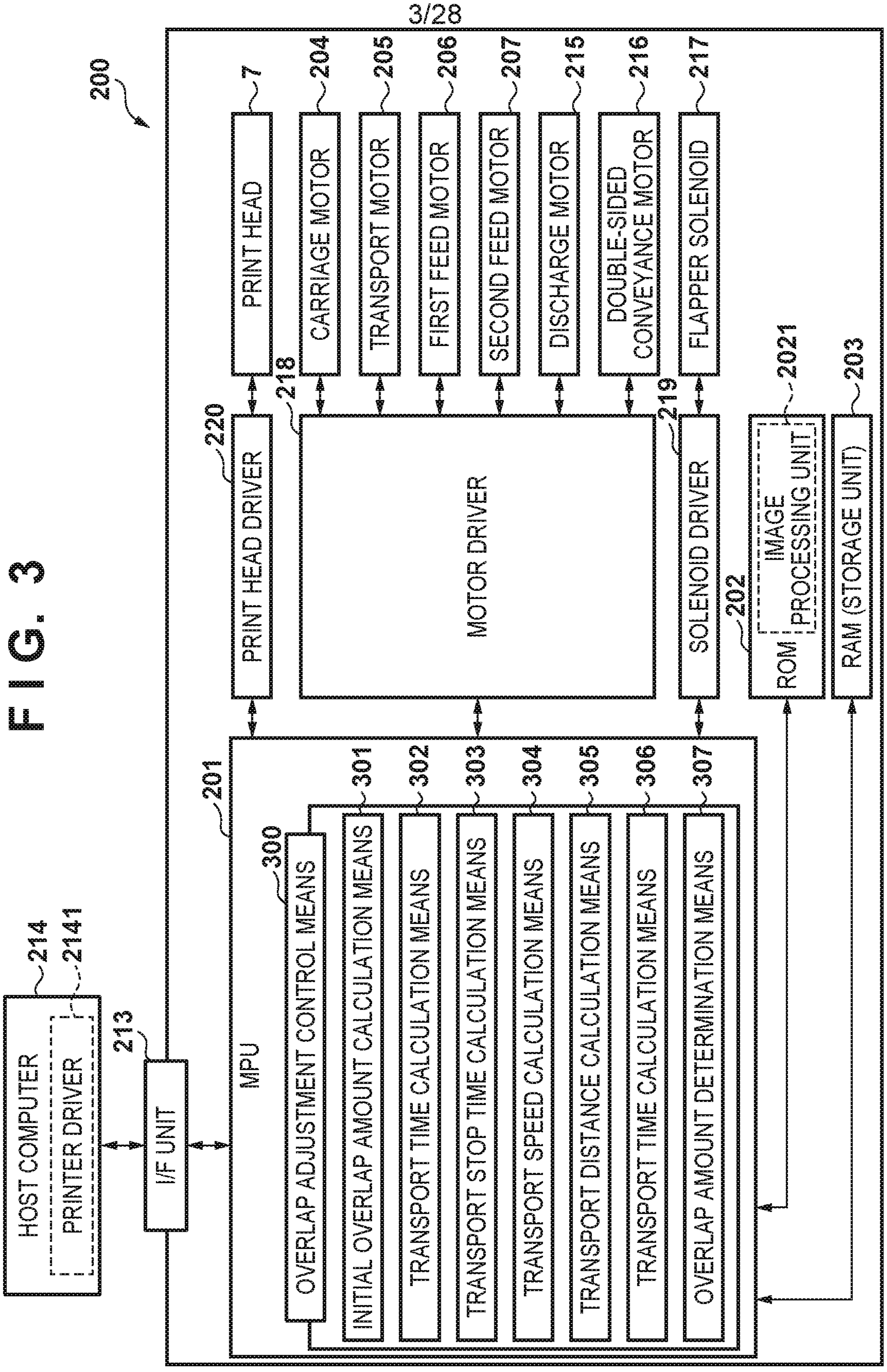
FIG. 3 is a block diagram illustrating the printing apparatus according to the first embodiment.

FIG. 3 is a block diagram illustrating the printing apparatus according to the present embodiment. 201 indicates an MPU that controls the operations of various units, data processing, and the like. As will be described later, the MPU 201 functions as transport control means capable of controlling the transport of print media such that a following end part of a preceding print medium and a leading end part of a following print medium overlap, and overlap amount adjustment control means 300 that adjusts an overlap amount. As will be described later, the overlap amount adjustment control means 300 includes initial overlap amount calculation means 301 that calculates an initial overlap amount from print data of the preceding print medium, transport time calculation means 302 that calculates a transport time from the print data of the following print medium, and transport stop time calculation means 303 that calculates a transport stop time from the print data of the following print medium. The overlap amount adjustment control means 300 also includes at least one of transport speed calculation means 304 that calculates the transport speed of the preceding print medium, transport distance calculation means 305 that calculates a transport distance of the preceding print medium, and transport time calculation means 306 that calculates the transport time of the preceding print medium. The overlap amount adjustment control means 300 also includes overlap amount determination means 307 that determines whether to adjust the overlap amount based on the transport speed, the transport distance, and the transport time of the preceding print medium. 202 indicates a ROM that stores programs executed by the MPU 201, data, and the like. 203 indicates a RAM that temporarily stores data processed by the MPU 201, data received from a host computer 214, and the like. Note that the means 300 to 307 described above are implemented by the MPU 201 executing programs stored in the ROM 202.

The print head 7 is controlled by a print head driver 220. The carriage 1 is driven by a carriage motor 204. The first transport roller 5 and the second transport roller 10 are driven by a transport motor 205. The pickup roller 2 is driven by a first feed motor 206. The feed roller 3 is driven by a second feed motor 207. The third transport roller 20 and the discharge roller 22 are driven by a discharge motor 215. The reversing roller 9 and the intermediate roller 15 are driven by the double-sided transport motor 216. The flapper 24 is driven by a flapper solenoid 217. The motors described above are controlled by a motor driver 218, which represents a plurality. The flapper solenoid 217 is controlled by a solenoid driver 219.

The host computer 214 is provided with a printer driver 2141 for compiling print information, such as a print image, the print image quality, and the like, and communicating that print information to the printing apparatus 200, when a user instructs printing operations to be executed. The MPU 201 exchanges print images and the like with the host computer 214 via an I/F unit 213.

Flow of Overlapping Continuous Feed Operations in Double-Sided Printing

Figure 5:
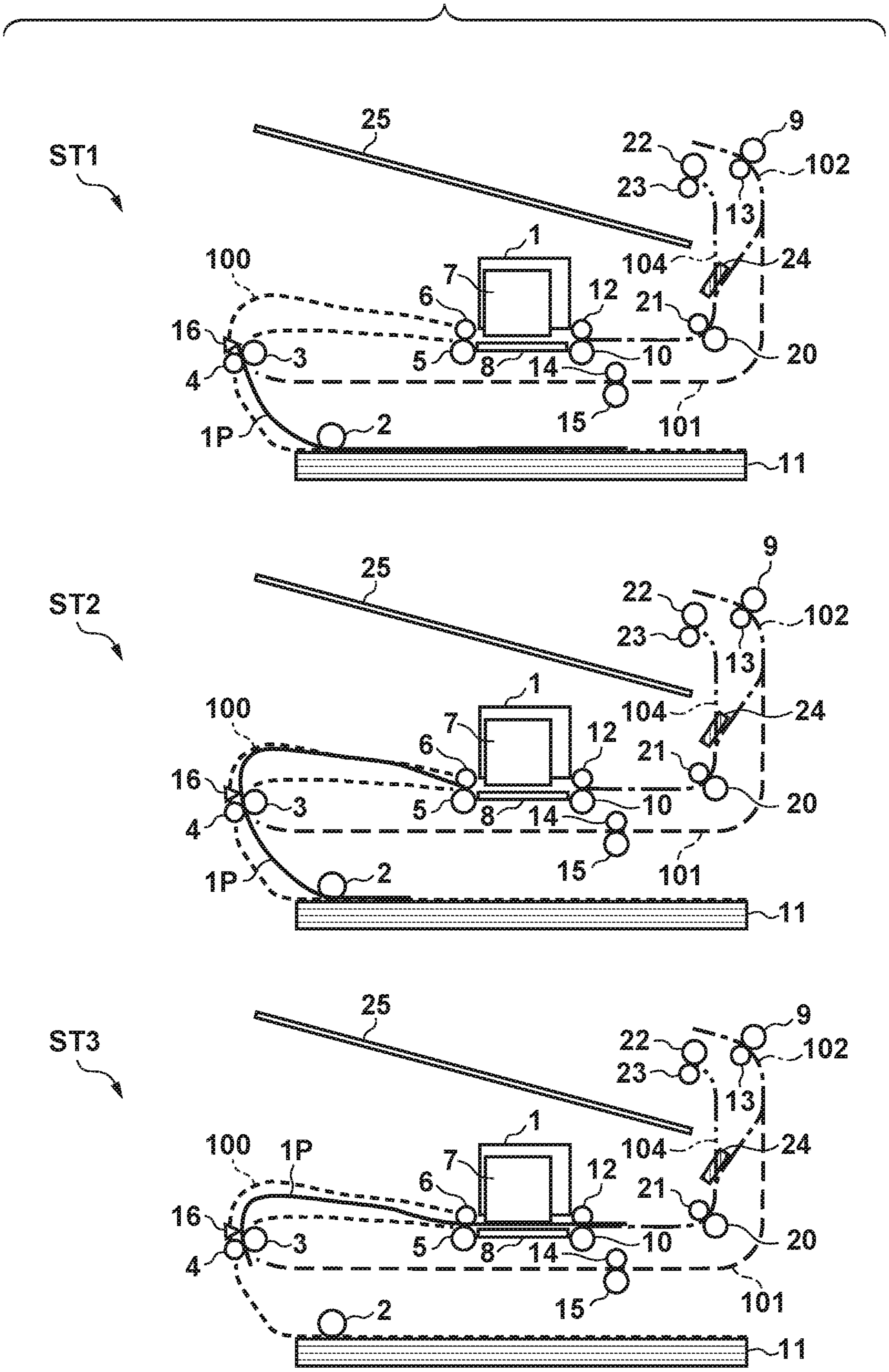
FIG. 5 is a diagram illustrating each of states in overlapping continuous feed operations according to the first embodiment.
Figure 12:
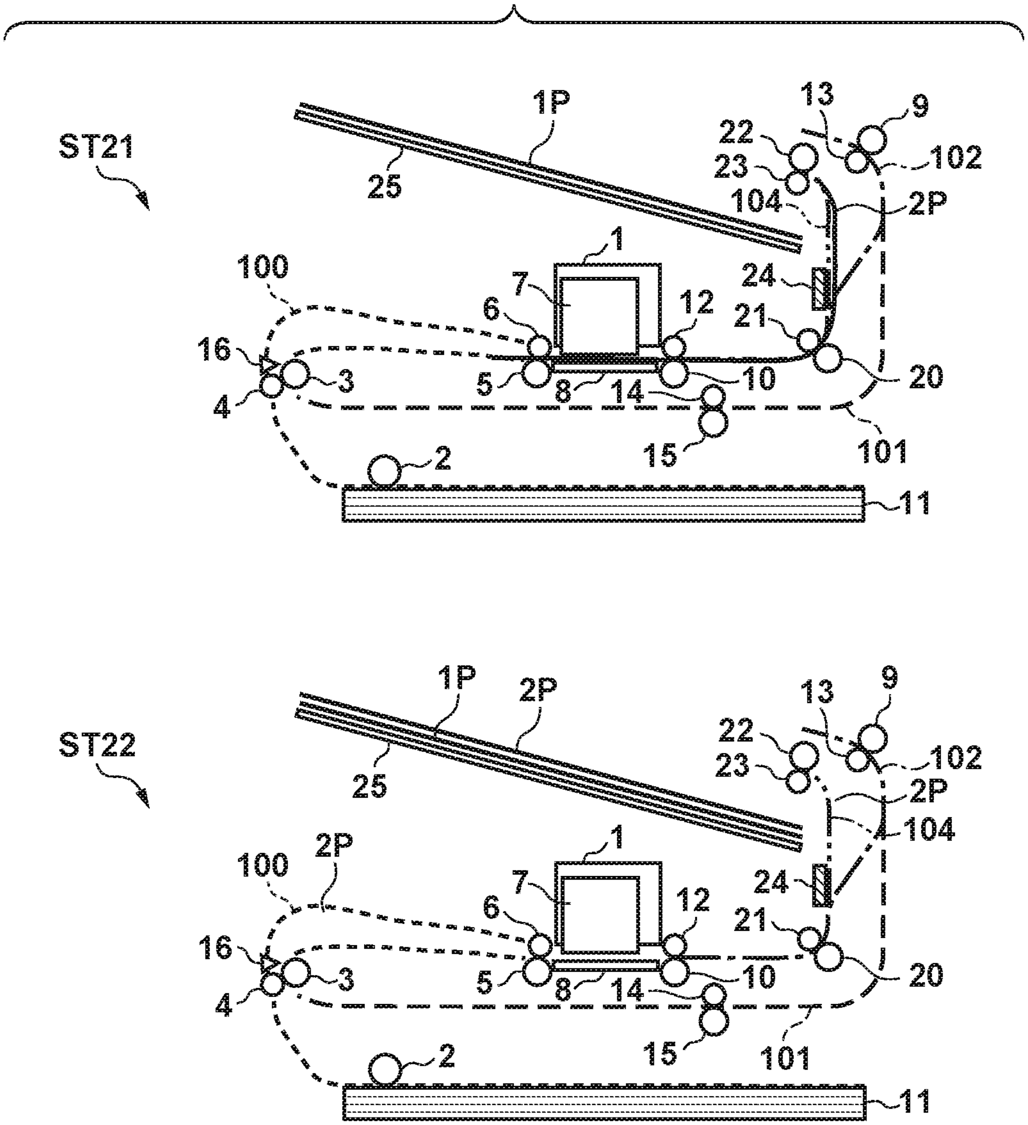
FIG. 12 is a diagram illustrating each of states in the overlapping continuous feed operations according to the first embodiment.

Operations in overlapping continuous feeding during a double-sided printing mode will be described in chronological order, using an example of printing four pages of print data on two sheets of the print medium P in a single job, with reference to ST1 in FIGS. 4 and 5 to ST22 in FIG. 12. When the print data in the double-sided printing mode in transmitted from the host computer 214 via the I/F unit 213, the print data is processed by the MPU 201 and then expanded in the RAM 203. The printing operations are then started based on the data expanded by the MPU 201.

The present embodiment will describe a case where the printing is performed through a sequence such as that illustrated in FIG. 4. Note that the printing sequence is set to a face-down method, in which the front surface is discharged face-down. However, the printing sequence is not intended to be limited to that described above.

Descriptions will be given with reference to ST1 in FIG. 5. First, the first feed motor 206 is driven at a low speed. The pickup roller 2 rotates at 7.6 inches/see as a result. When the pickup roller 2 rotates, the topmost print medium P loaded in the paper loading unit 11 is picked up. The first print medium P picked up by the pickup roller 2 ("print medium IP" in the drawings) is transported by the feed roller 3, which is rotating in the same direction as the pickup roller 2. The feed roller 3 is driven by the second feed motor 207, at the same speed as the pickup roller 2.

After rotating a predetermined amount such that the print medium P can be transported to a position beyond the feed roller 3, the pickup roller 2 stops so as not to pick up the next print medium P. The pickup roller 2 is a one-way roller, and thus transport by the feed roller 3 can continue even after the pickup roller 2 stops. The present embodiment describes a configuration that includes the pickup roller 2 and the feed roller 3. However, the configuration may be such that only the feed roller 3 that feeds the print medium P loaded in the paper loading unit 11 is included.

When the leading end of the first print medium 1P is sensed by the print medium sensor 16 provided downstream from the feed roller 3 in the transport direction, the second feed motor 207 switches to high-speed driving. In other words, the feed roller 3 rotates at 20 inches/sec.

Descriptions will now be given with reference to ST2 in FIG. 5. As the feed roller 3 continues to rotate, the downstream-side leading end of the first print medium IP in the transport direction contacts the transport nip part formed by the first transport roller 5 and the pinch roller 6. The first transport roller 5 is stopped at this time. The feed roller 3 is rotated a predetermined amount even after the downstream-side leading end of the first print medium 1P in the transport direction contacts the transport nip part, and as a result, the leading end of the first print medium 1P is aligned while in contact with the transport nip part, which corrects skew. These skew correction operations are also called "registration operations".

Descriptions will now be given with reference to ST3 in FIG. 5. Once the skew correction operations for the first print medium P end, the first transport roller 5 begins rotating as a result of being driven by the transport motor 205. The first transport roller 5 transports the print medium P at 15 inches/sec. After the first print medium IP is cued to a position opposite the print head 7, printing operations for the second page of the print data are started on the second surface of the first print medium 1P by the print head 7 ejecting ink based on the print data. Note that the cueing operations are performed by first positioning the leading end of the first print medium P at the position of the first transport roller 5 by bringing the leading end into contact with the transport nip part, and then controlling the rotation amount of the first transport roller 5 using the position of the first transport roller 5 as a reference.

The printing apparatus in the present embodiment is a serial-type printing apparatus in which the print head 7 is mounted on the carriage 1. Transport operations, in which the print medium P is transported by the first transport roller 5 intermittently by a predetermined amount at a time, and image forming operations, in which ink is ejected from the print head 7 while moving the carriage 1 on which the print head 7 is mounted while the first transport roller 5 is stopped, are repeated. As a result, the printing operations are performed on the first print medium IP.

Once the first print medium 1P is cued, the second feed motor 207 is switched to low-speed driving. In other words, the feed roller 3 rotates at 7.6 inches/sec. When the first print medium 1P is transported by the first transport roller 5 intermittently by a predetermined amount at a time, the feed roller 3 is also driven intermittently by the second feed motor 207. In other words, when the first transport roller 5 is rotating, the feed roller 3 also rotates, and when the first transport roller 5 is stopped, the feed roller 3 is also stopped. The rotational speed of the feed roller 3 is lower than the rotational speed of the first transport roller 5. Accordingly, the print medium P becomes taut between the first transport roller 5 and the feed roller 3. Additionally, the feed roller 3 is rotated by the first print medium IP transported by the first transport roller 5.

Due to factors such as sensor responsiveness and the like, the print medium sensor 16 requires at least a predetermined interval between print media in order to sense the end part of the print medium P. In other words, it is necessary to provide a predetermined time interval between when the print medium sensor 16 senses the upstream-side end part of the first print medium IP in the transport direction and when the print medium sensor 16 senses the downstream-side leading end of the second print medium P (indicated by "2P" hereinafter) in the transport direction. As such, it is necessary for the upstream-side end part of the first print medium 1P in the transport direction and the downstream-side leading end part of the second print medium 2P in the transport direction to be separated by a predetermined distance. Accordingly, the pickup operations for the second print medium 2P are performed after determining that the upstream-side end part of the first print medium 1P in the transport direction has passed the sensor 16. Additionally, the rotation of the pickup roller 2 is controlled such that the interval between the upstream-side end part of the first print medium 1P in the transport direction and the downstream-side leading end part of the second print medium 2P in the transport direction is at least a predetermined distance. The leading end position and the following end position of each print medium may be obtained from the rotation amounts of the various rollers, or may be calculated by a separate sensor.

Note that when the first print medium IP is being transported intermittently by the first transport roller 5 a predetermined amount at a time, the third transport roller 20 and the reversing roller 9 are driven intermittently, in the same rotation direction and speed as the first transport roller 5, by the discharge motor 215 and the double-sided transport motor 216.

Figure 6:
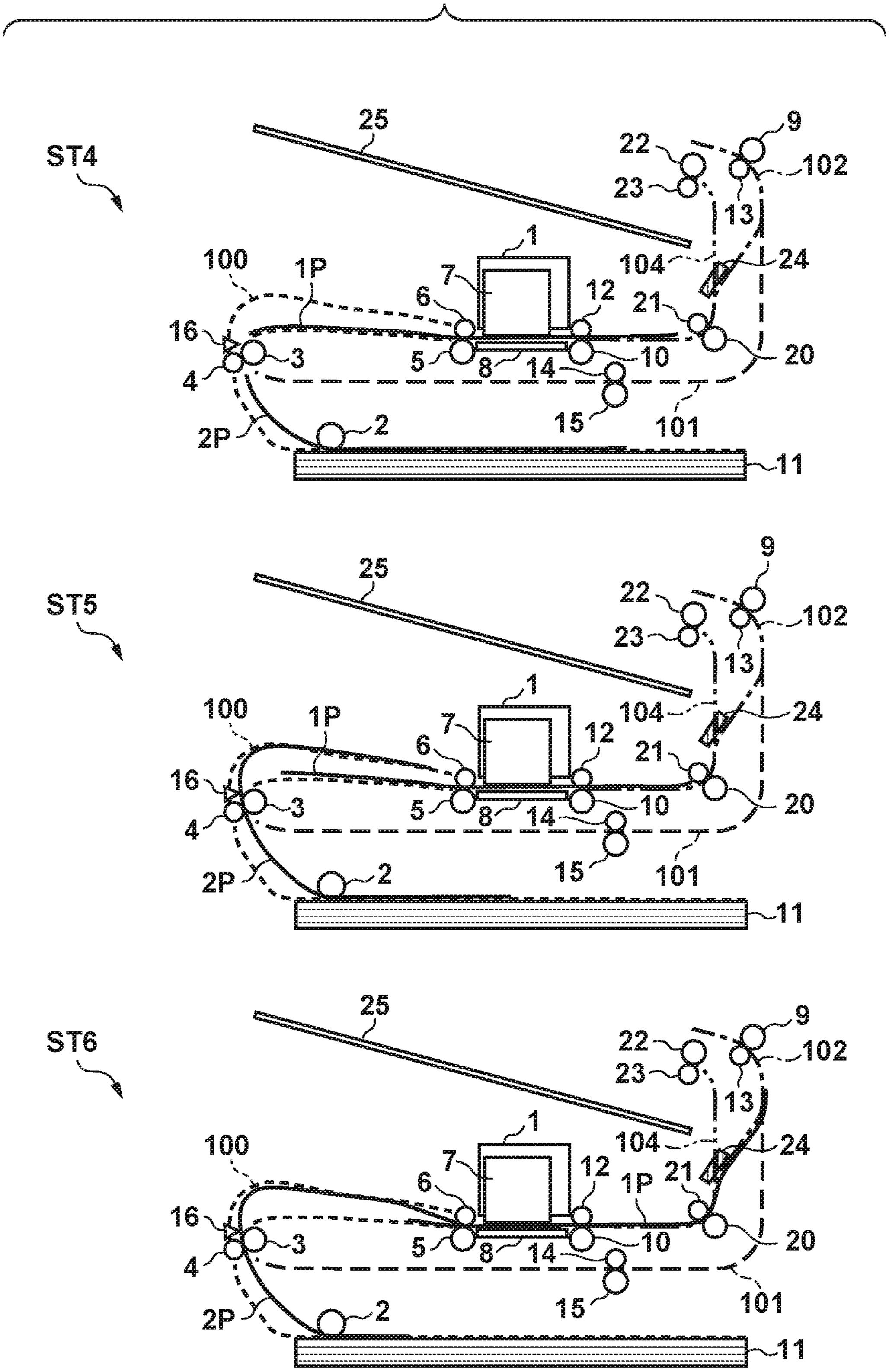
FIG. 6 is a diagram illustrating each of states in the overlapping continuous feed operations according to the first embodiment.

Descriptions will now be given with reference to ST4 in FIG. 6. The second print medium 2P picked up by the pickup roller 2 is transported by the feed roller 3. At this time, image forming operations are being performed on the first print medium 1P by the print head 7 based on the print data. When the leading end of the second print medium 2P is sensed by the print medium sensor 16, the second feed motor 207 is switched to high-speed driving. In other words, the feed roller 3 rotates at 20 inches/sec.

Descriptions will now be given with reference to ST5 in FIG. 6. As a result of the printing operations by the print head 7, the second print medium 2P is moved at a higher speed than the speed at which the first print medium IP moves downstream. As a result, a state can be created in which the downstream-side leading end part of the second print medium 2P in the transport direction overlaps the upstream-side end part of the first print medium 1P in the transport direction. The printing operations are performed based on the print data for the first print medium 1P, and thus the first print medium IP is transported intermittently by the first transport roller 5. On the other hand, continuously rotating the feed roller 3 at 20 inches/see after the downstream-side leading end of the second print medium 2P in the transport direction is sensed by the print medium sensor 16 makes it possible to catch up to the first print medium IP. The second print medium 2P is then transported by the feed roller 3 until the downstream-side leading end thereof in the transport direction stops at a predetermined position upstream from the transport nip. The position of the downstream-side leading end of the second print medium 2P in the transport direction is calculated from the rotation amount of the feed roller 3 after the downstream-side leading end of the second print medium 2P in the transport direction is sensed by the print medium sensor 16, and is controlled based on the result of the calculation. At this time, image forming operations are being performed on the first print medium 1P by the print head 7 based on the print data.

Descriptions will now be given with reference to ST6 in FIG. 6. When the first transport roller 5 is stopped to perform the image forming operations (ink ejection operations) for the final line of the first print medium IP, the skew correction operations for the second print medium 2P are performed by driving the feed roller 3 to cause the leading end of the second print medium 2P to contact the transport nip part.

Note that the processing after the printing onto the first print medium 1P is reversal, and thus the flapper 24 is pivoted in advance by the flapper solenoid 217 toward a path leading to the reversing roller 9 via the third transport path 102. Accordingly, the first print medium IP is transported toward the reversing roller 9 while being guided by the third transport path 102. In the subsequent operations, after the upstream-side end part of the print medium P in the transport direction passes the flapper 24, the flapper 24 is pivoted in accordance with the processing after the printing on the print medium P that passes the flapper 24 next. The determination as to whether the upstream-side end part of the print medium P in the transport direction has passed the flapper 24 may be made based on the rotation amounts of the various rollers, or by a sensor provided separately.

Figure 7:
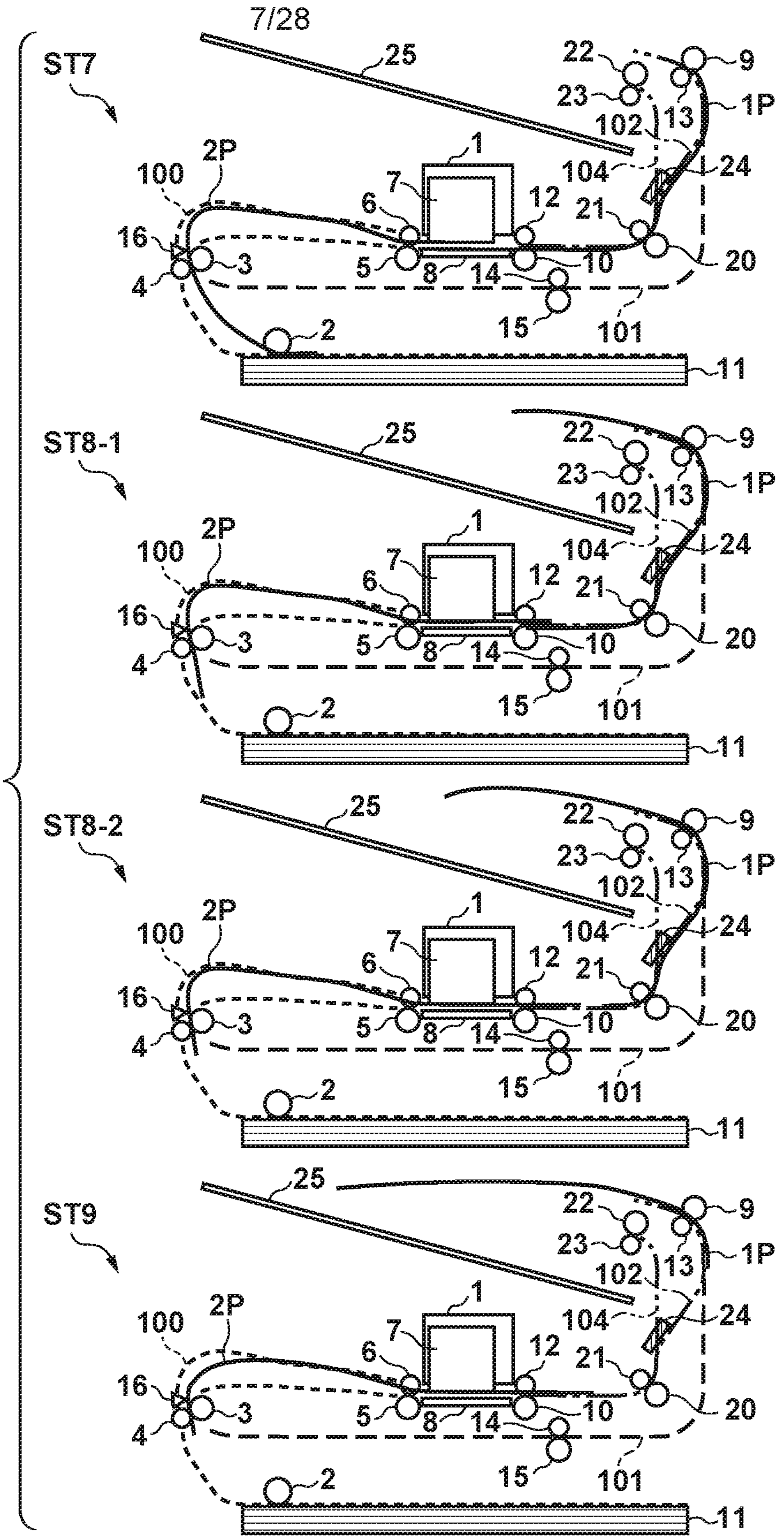
FIG. 7 is a diagram illustrating each of states in the overlapping continuous feed operations according to the first embodiment.

Descriptions will now be given with reference to ST7 in FIG. 7. When the image forming operations for the final line of the first print medium IP end, the second print medium 2P can be cued by rotating the first transport roller 5 by a predetermined amount and keeping the second print medium 2P in a state of overlap on the first print medium IP.

Once the second print medium 2P is cued, the second feed motor 207 is switched to low-speed driving. In other words, the feed roller 3 rotates at 7.6 inches/sec. When the second print medium 2P is transported by the first transport roller 5 intermittently by a predetermined amount at a time, the feed roller 3 is also driven intermittently by the second feed motor 207. The printing operations for printing the fourth page of the print data onto the second surface of the second print medium 2P are started by ejecting ink from the print head 7 onto the second print medium 2P based on the print data. When the second print medium 2P is transported intermittently for the printing operations, the first print medium 1P is also transported intermittently.

Separation Operations (When Moving toward Second Transport Path 101)

Descriptions will now be given with reference to ST8-1 and ST8-2 in FIG. 7. After the upstream-side end part of the first print medium IP in the transport direction is determined to have passed the second transport roller 10 based on the rotation amount of the first transport roller 5 after the start of cueing operations and the length of the paper, separation operations are performed by continuously rotating the third transport roller 20 using the discharge motor 215, independent of the first transport roller 5 and the second transport roller 10. Note that the double-sided transport motor 216 rotates forward, and the reversing roller 9 is also rotated in the direction of the arrow A in FIG. 2, at the same speed as the third transport roller 20. At this time, the preceding first print medium IP is transported by the third transport roller 20. The speed of the third transport roller 20 is controlled such that an interval between the downstream-side end part of the second print medium 2P in the transport direction and the upstream-side end part of the first print medium IP in the transport direction is at least a predetermined distance before the upstream-side end part in the transport direction passes the third transport roller 20. The method for calculating the speed of the third transport roller 20 at this time will be described in detail later with reference to a control flow. Setting the aforementioned predetermined distance to be greater than 0 makes it possible for the first print medium IP and the second print medium 2P to be separated, canceling the state of overlap between the upstream-side end part of the first print medium IP in the transport direction and the downstream-side leading end of the second print medium 2P in the transport direction.

This makes it possible to reduce the possibility of paper jams occurring when switching the transport path using the flapper 24.

Note that in canceling the state of overlap, the speed of the third transport roller 20 may be made faster than that of the first transport roller 5, but it is not absolutely necessary for the speed of the third transport roller 20 to be faster than that of the first transport roller 5. When the first transport roller 5 transports the second print medium 2P intermittently for the printing operations, some time is required for the intermittent transport, such as the scanning time of the carriage 1. In this case, the time until the downstream-side end part of the second print medium 2P in the transport direction, which is transported by the first transport roller 5, passes the third transport roller 20, is longer than when the second print medium 2P is not being transported intermittently for the printing operations. The speed of the third transport roller 20 can therefore be reduced. In other words, performing the separation operations during the printing operations makes it possible to reduce the transport speed for the separation and suppress an increase in noise, power consumption, and the like, compared to a case where the separation operations are not performed during the printing operations.

Then, as will be described later, the first print medium 1P is reversed by the reversing roller 9 and enters into the second transport path 101, and the upstream-side end part of the first print medium IP in the transport direction enters into the second transport path 101. The downstream-side leading end of the second print medium P in the transport direction can then pass through a branch part branching to the second transport path 101 and reach the reversing roller 9.

Descriptions will now be given with reference to ST9 in FIG. 7. When the reversing roller 9 rotates in the direction of the arrow A in STD in FIG. 2, the first print medium P is transported in the direction of the arrow C in STD in FIG. 2. As a result, the first print medium Pis continuously transported until the upstream-side end part thereof in the transport direction reaches a predetermined position on the upstream side of the reversing roller 9 in the transport direction.

Note that after the upstream-side end part of the print medium P in the transport direction passes the flapper 24, the flapper 24 is pivoted in accordance with the processing after the printing on the print medium P that passes the flapper 24 next. The processing after the printing of the second print medium P is reversal, and thus the second print medium P is transported toward the reversing roller 9 while being guided by the third transport path 102. The determination as to whether the upstream-side end part of the print medium P in the transport direction has passed the flapper 24 may be made based on the rotation amounts of the various rollers, or by a sensor provided separately.

Figure 8:
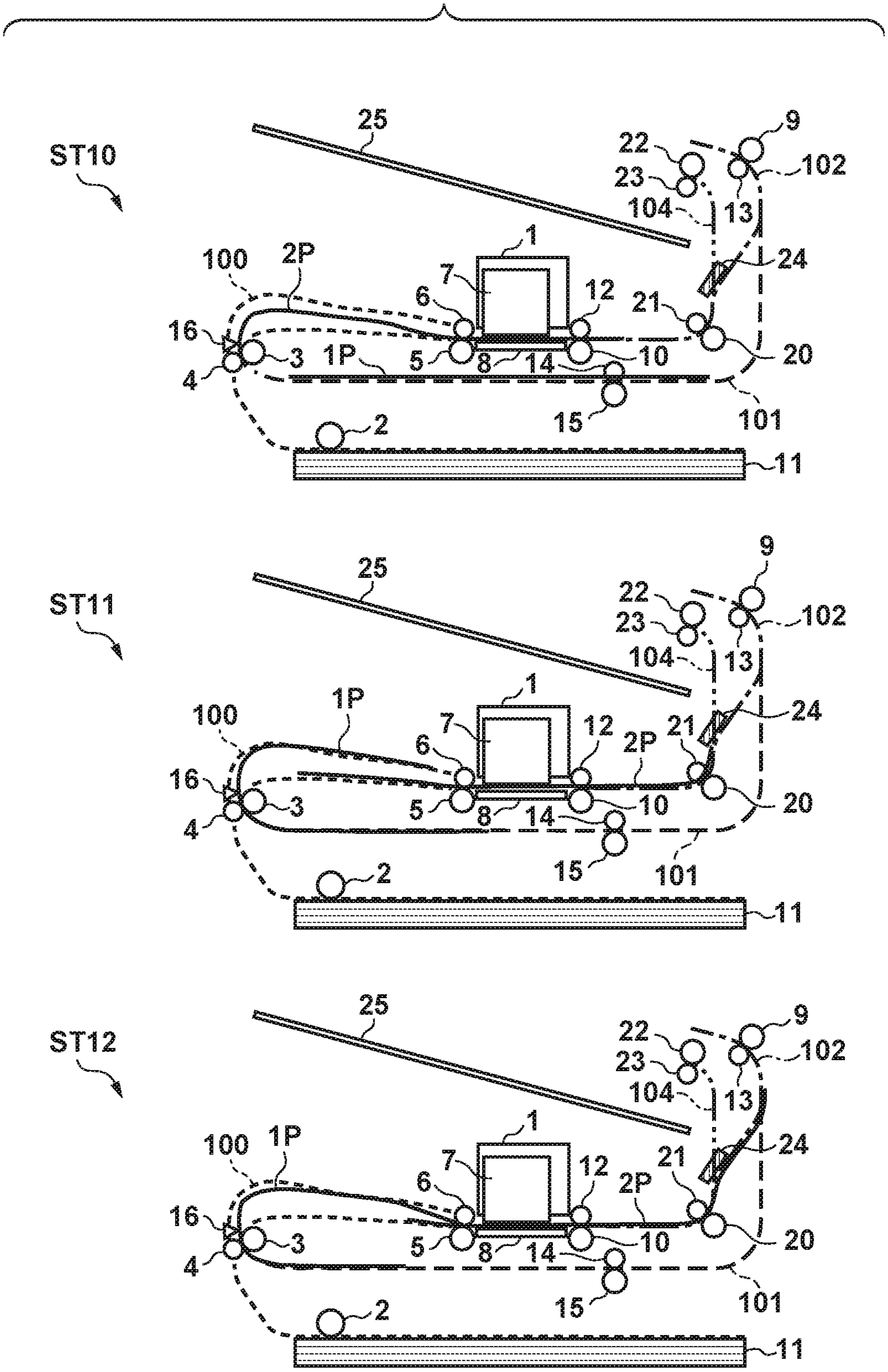
FIG. 8 is a diagram illustrating each of states in the overlapping continuous feed operations according to the first embodiment.

Descriptions will now be given with reference to ST10 in FIG. 8. When the upstream-side end part of the first print medium 1P in the transport direction reaches the predetermined position on the upstream side of the reversing roller 9 in the transport direction, the double-sided transport motor 216 is switched to being driven in reverse at high speed. As a result, the reversing roller 9 and the intermediate roller 15 are rotated at 18 inches/see in the direction of the arrow B in STF in FIG. 2. Then, the first print medium 1P is transported by the reversing roller 9 and the intermediate roller 15 along the guide within the second transport path (the reversing path) 101, until the downstream-side leading end thereof in the transport direction reaches a predetermined position before the first transport path 100. The aforementioned predetermined position at this time is also calculated based on the rotation amount of the transport roller since the start of the cueing operations and the length of the sheets.

Descriptions will now be given with reference to ST11 in FIG. 8. When the transport of the second print medium 2P progresses and the upstream-side end part of the second print medium P in the transport direction is sensed by the print medium sensor 16, the double-sided transport motor 216 is driven in reverse at low speed, and the second feed motor 207 is driven at low speed. As a result, the intermediate roller 15 and the feed roller 3 are rotated at 7.6 inches/sec. Then, the first print medium IP is transported by the intermediate roller 15 and the feed roller 3 from the second transport path 101 to the first transport path 100 in the direction of the first transport roller 5. At this time, image forming operations are being performed on the second print medium 2P by the print head 7 based on the print data. When the downstream-side leading end of the first print medium 1P in the transport direction is sensed by the print medium sensor 16, the double-sided transport motor 216 is switched to driving at high speed, while remaining in reverse, and the second feed motor 207 is switched to driving at high speed. In other words, the intermediate roller 15 and the feed roller 3 rotate at 20 inches/sec.

Moving the first print medium 1P at a higher speed than the speed at which the second print medium 2P is moved downstream as a result of the printing operations by the print head 7 makes it possible to create a state where the leading end part of the first print medium 1P overlaps the following end part of the second print medium 2P. The printing operations are performed based on the print data for the second print medium 2P, and thus the second print medium 2P is transported intermittently by the first transport roller 5. On the other hand, continuously rotating the feed roller 3 at 20 inches/see after the leading end of the first print medium 1P is sensed by the print medium sensor 16 makes it possible to catch up to the second print medium 2P. The first print medium 1P is then transported by the feed roller 3 until the downstream-side leading end thereof in the transport direction stops at a predetermined position upstream from the transport nip. The position of the downstream-side leading end of the first print medium IP in the transport direction is calculated from the rotation amount of the feed roller 3 after the downstream-side leading end of the first print medium IP in the transport direction is sensed by the print medium sensor 16, and is controlled based on the result of the calculation. At this time, image forming operations are being performed on the second print medium 2P by the print head 7 based on the print data.

Descriptions will now be given with reference to ST12 in FIG. 8. When the first transport roller 5 is stopped to perform the image forming operations (ink ejection operations) for the final line of the second print medium 2P, the feed roller 3 is driven to cause the downstream-side leading end of the first print medium IP in the transport direction to contact the transport nip part. Through this, the skew correction operations are performed for the first print medium IP.

Figure 9:
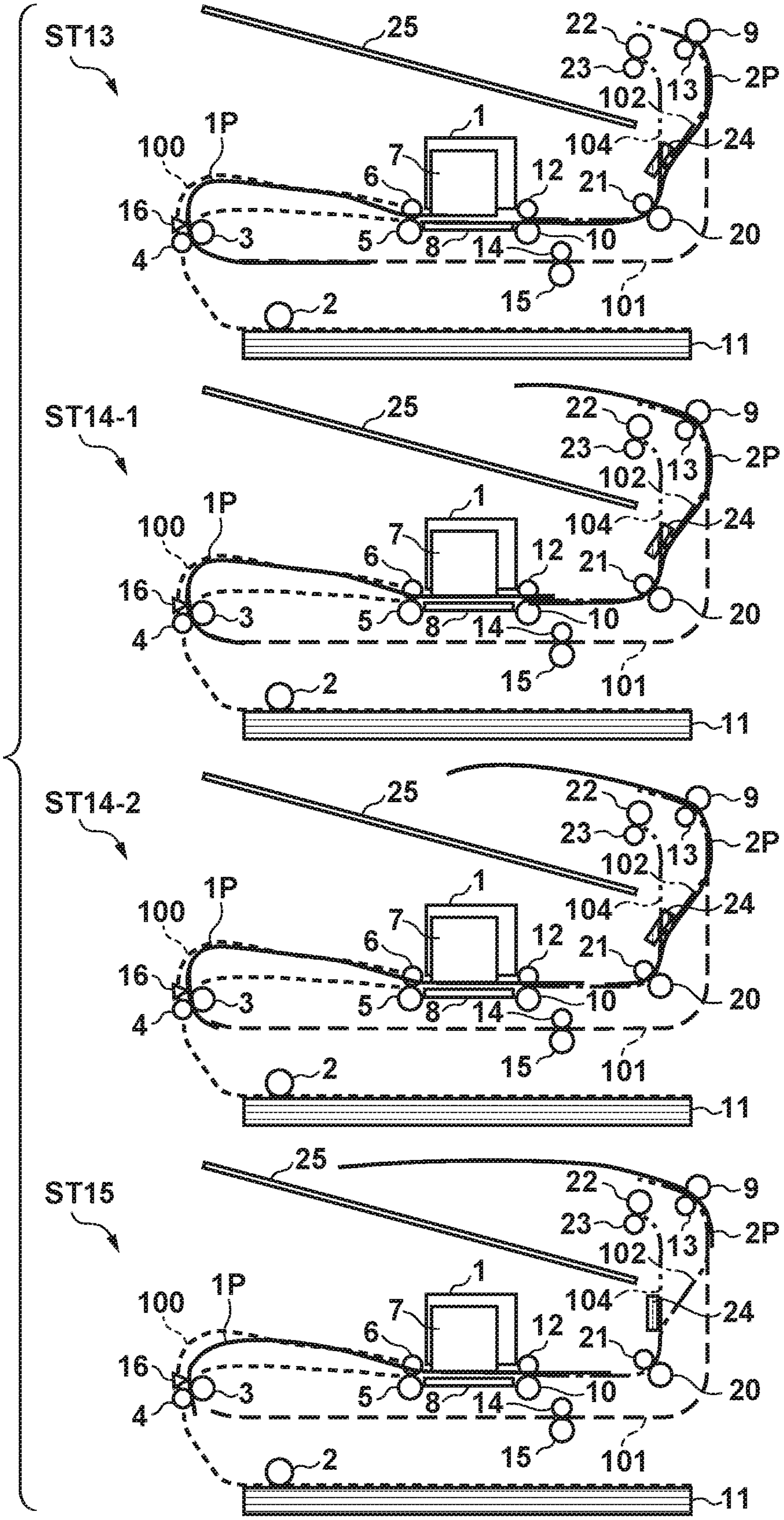
FIG. 9 is a diagram illustrating each of states in the overlapping continuous feed operations according to the first embodiment.

Descriptions will now be given with reference to ST13 in FIG. 9. When the image forming operations for the final line of the second print medium 2P end, the first print medium 1P can be cued by rotating the first transport roller 5 by a predetermined amount and keeping the first print medium IP in a state of overlap on the second print medium 2P.

Once the first print medium IP is cued, the second feed motor 207 is switched to low-speed driving. In other words, the feed roller 3 rotates at 7.6 inches/sec. When the first print medium IP is transported by the first transport roller 5 intermittently by a predetermined amount at a time, the feed roller 3 is also driven intermittently by the second feed motor 207. The printing operations for printing the first page of the print data onto the first surface of the first print medium P are started by ejecting ink from the print head 7 onto the first print medium 1P based on the print data. When the first print medium 1P is transported intermittently for the printing operations, the second print medium 2P is also transported intermittently.

Separation Operations (When Moving toward Second Transport Path 101)

Descriptions will now be given with reference to ST14-1 and ST14-2 in FIG. 9. After the upstream-side end part of the second print medium 2P in the transport direction is determined to have passed the second transport roller 10 based on the rotation amount of the first transport roller 5 after the start of cueing operations and the length of the paper, separation operations are performed by continuously rotating the third transport roller 20 using the discharge motor 215, independent of the first transport roller 5 and the second transport roller 10. Note that the double-sided transport motor 216 rotates forward, and the reversing roller 9 is also rotated in the direction of the arrow A in FIG. 2, at the same speed as the third transport roller 20. At this time, the preceding second print medium 2P is transported by the third transport roller 20. The speed of the third transport roller 20 is controlled such that an interval between the downstream-side end part of the first print medium IP in the transport direction and the upstream-side end part of the second print medium 2P in the transport direction is at least a predetermined distance before the upstream-side end part in the transport direction passes the third transport roller 20. The method for calculating the speed of the third transport roller 20 at this time will be described in detail later with reference to a control flow. Setting the aforementioned predetermined distance to be greater than 0 makes it possible for the second print medium 2P and the first print medium 1P to be separated, canceling the state of overlap between the upstream-side end part of the second print medium 2P in the transport direction and the downstream-side leading end of the first print medium IP in the transport direction.

This makes it possible to reduce the possibility of paper jams occurring when switching the transport path using the flapper 24.

Note that in canceling the state of overlap, the speed of the third transport roller 20 may be made faster than that of the first transport roller 5, but it is not absolutely necessary for the speed of the third transport roller 20 to be faster than that of the first transport roller 5. When the first transport roller 5 transports the first print medium 1P intermittently for the printing operations, some time is required for the intermittent transport, such as the scanning time of the carriage 1. In this case, the time until the downstream-side end part of the first print medium 1P in the transport direction, which is transported by the first transport roller 5, passes the third transport roller 20, is longer than when the first print medium 1P is not being transported intermittently for the printing operations. The speed of the third transport roller 20 can therefore be reduced. In other words, performing the separation operations during the printing operations makes it possible to reduce the transport speed for the separation and suppress an increase in noise, power consumption, and the like, compared to a case where the separation operations are not performed during the printing operations.

Descriptions will now be given with reference to ST15 in FIG. 9. When the reversing roller 9 rotates in the direction of the arrow A in STD in FIG. 2, the second print medium 2P is transported in the direction of the arrow C in STD in FIG. 2. As a result, the second print medium 2P is continuously transported until the upstream-side end part thereof in the transport direction reaches a predetermined position on the upstream side of the reversing roller 9 in the transport direction.

Note that after the upstream-side end part of the print medium P in the transport direction passes the flapper 24, the flapper 24 is pivoted in accordance with the processing after the printing on the print medium P that passes the flapper 24 next. The processing after the printing of the first print medium 1P is discharge, and thus the first print medium IP is transported toward the discharge roller 22 while being guided by the fourth transport path 104. The determination as to whether the upstream-side end part of the print medium P in the transport direction has passed the flapper 24 may be made based on the rotation amounts of the various rollers, or by a sensor provided separately.

Figure 10:
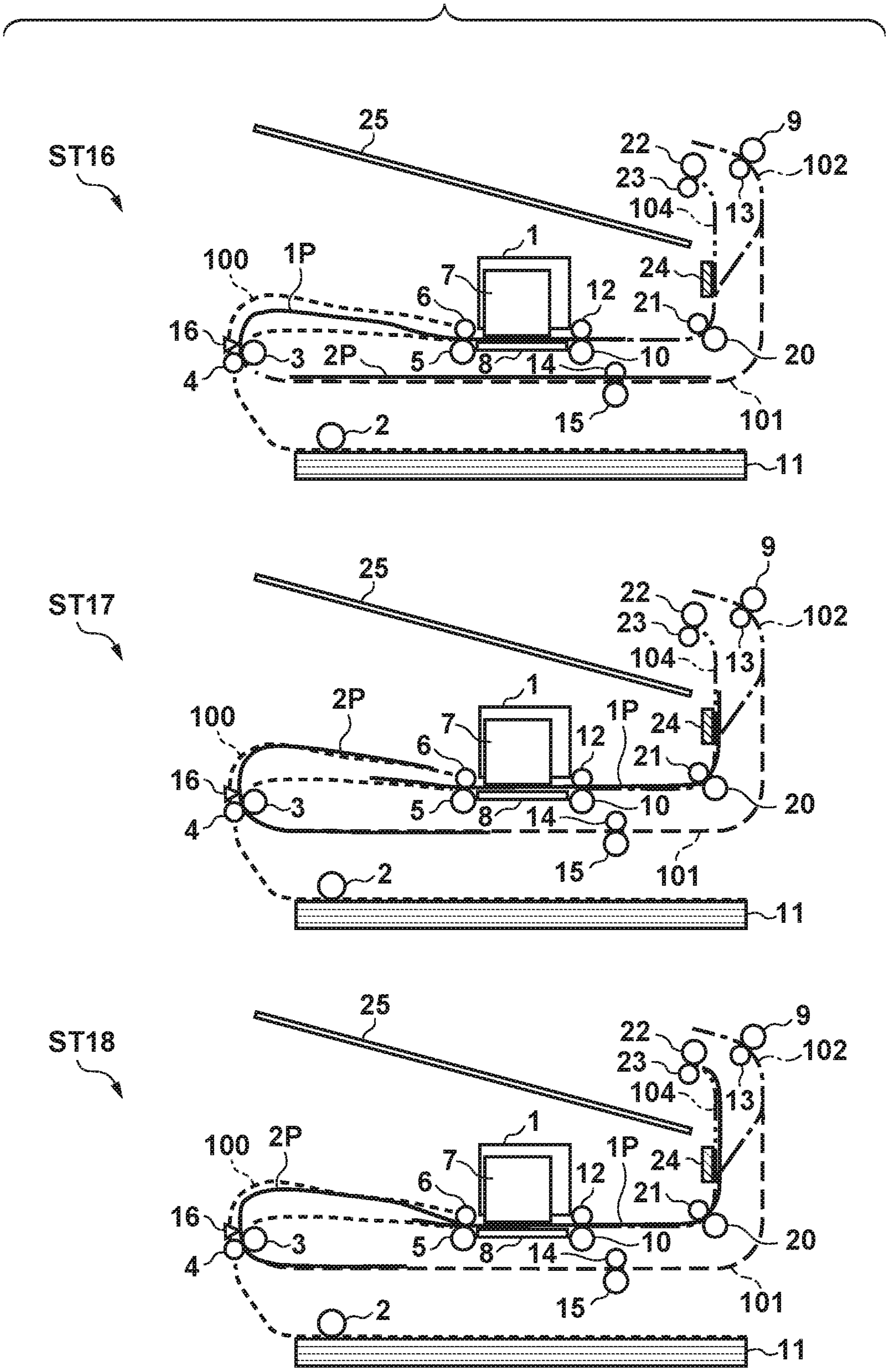
FIG. 10 is a diagram illustrating each of states in the overlapping continuous feed operations according to the first embodiment.

Descriptions will now be given with reference to ST16 in FIG. 10. When the upstream-side end part of the second print medium 2P in the transport direction reaches the predetermined position on the upstream side of the reversing roller 9 in the transport direction, the double-sided transport motor 216 is switched to being driven in reverse at high speed. As a result, the reversing roller 9 and the intermediate roller 15 are rotated at 18 inches/see in the direction of the arrow B in STF in FIG. 2. Then, the second print medium 2P is transported by the reversing roller 9 and the intermediate roller 15 along the guide within the second transport path (the reversing path) 101, until the downstream-side leading end thereof in the transport direction reaches a predetermined position before the first transport path 100. The aforementioned predetermined position at this time is also calculated based on the rotation amount of the transport roller since the start of the cueing operations and the length of the sheets.

Descriptions will now be given with reference to ST17 in FIG. 10. When the transport of the first print medium IP progresses and the upstream-side end part of the first print medium IP in the transport direction is sensed by the print medium sensor 16, the double-sided transport motor 216 is driven in reverse at low speed, and the second feed motor 207 is driven at low speed. As a result, the intermediate roller 15 and the feed roller 3 are rotated at 7.6 inches/sec. Then, the second print medium 2P is transported by the intermediate roller 15 and the feed roller 3 from the second transport path 101 to the first transport path 100 in the direction of the first transport roller 5. At this time, image forming operations are being performed on the first print medium IP by the print head 7 based on the print data. When the downstream-side leading end of the second print medium 2P in the transport direction is sensed by the print medium sensor 16, the double-sided transport motor 216 is switched to driving at high speed, while remaining in reverse, and the second feed motor 207 is switched to driving at high speed. In other words, the intermediate roller 15 and the feed roller 3 rotate at 20 inches/sec.

Moving the second print medium 2P at a higher speed than the speed at which the first print medium IP is moved downstream as a result of the printing operations by the print head 7 makes it possible to create a state where the leading end part of the second print medium 2P overlaps the following end part of the first print medium IP. The printing operations are performed based on the print data for the first print medium 1P, and thus the first print medium 1P is transported intermittently by the first transport roller 5. On the other hand, continuously rotating the feed roller 3 at 20 inches/see after the leading end of the second print medium 2P is sensed by the print medium sensor 16 makes it possible to catch up to the first print medium 1P. The second print medium 2P is then transported by the feed roller 3 until the downstream-side leading end thereof in the transport direction stops at a predetermined position upstream from the transport nip. The position of the downstream-side leading end of the second print medium 2P in the transport direction is calculated from the rotation amount of the feed roller 3 after the downstream-side leading end of the second print medium 2P in the transport direction is sensed by the print medium sensor 16, and is controlled based on the result of the calculation. At this time, image forming operations are being performed on the first print medium IP by the print head 7 based on the print data. Descriptions will now be given with reference to ST18 in FIG. 10.

When the first transport roller 5 is stopped to perform the image forming operations (ink ejection operations) for the final line of the first print medium 1P, the feed roller 3 is driven to cause the downstream-side leading end of the second print medium 2P in the transport direction to contact the transport nip part. Through this, the skew correction operations are performed for the second print medium 2P, Descriptions will now be given with reference to ST19 in FIG. 11. When the image forming operations for the final line of the first print medium IP end, the second print medium 2P can be cued by rotating the first transport roller 5 by a predetermined amount and keeping the second print medium 2P in a state of overlap on the first print medium 1P.

Once the second print medium 2P is cued, the second feed motor 207 is switched to low-speed driving. In other words, the feed roller 3 rotates at 7.6 inches/sec. When the second print medium 2P is transported by the first transport roller 5 intermittently by a predetermined amount at a time, the feed roller 3 is also driven intermittently by the second feed motor 207. The printing operations for printing the third page of the print data onto the first surface of the second print medium 2P are started by ejecting ink from the print head 7 onto the second print medium 2P based on the print data. When the second print medium 2P is transported intermittently for the printing operations, the first print medium IP is also transported intermittently.

Separation Operations (When Moving toward Fourth Transport Path 104)

Figure 11:
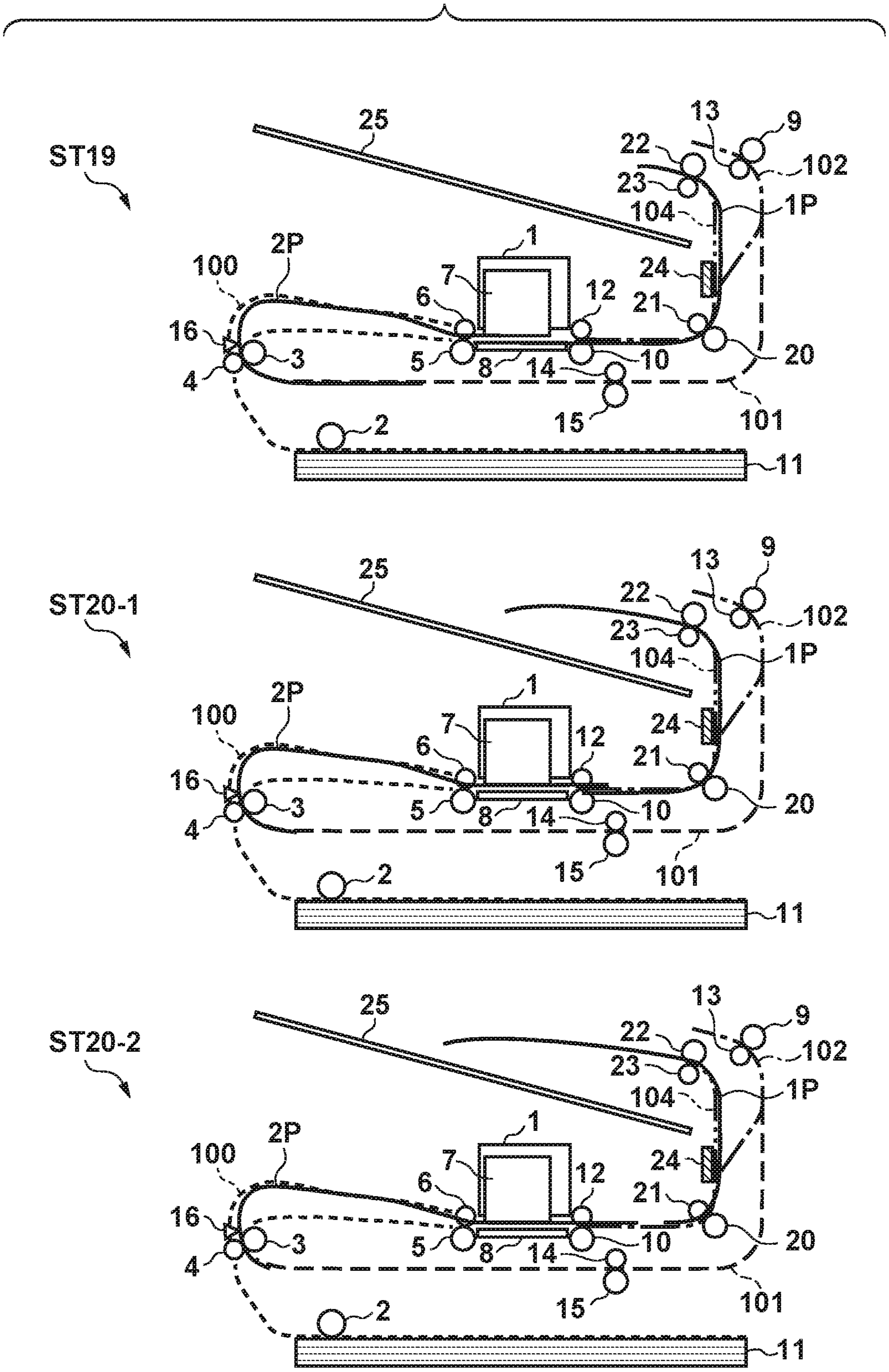
FIG. 11 is a diagram illustrating each of states in the overlapping continuous feed operations according to the first embodiment.

Descriptions will now be given with reference to ST20-1 and ST20-2 in FIG. 11. After the upstream-side end part of the first print medium IP in the transport direction is determined to have passed the second transport roller 10 based on the rotation amount of the first transport roller 5 after the start of cueing operations and the length of the paper, separation operations are performed by continuously rotating the third transport roller 20 and the discharge roller 22 using the discharge motor 215, independent of the first transport roller 5 and the second transport roller 10. At this time, the preceding first print medium 1P is transported by the third transport roller 20. Then, before the upstream-side end part in the transport direction passes the third transport roller 20, the speed of the third transport roller 20 is controlled such that the interval between the downstream-side end part of the second print medium 2P in the transport direction and the upstream-side end part of the first print medium IP in the transport direction is at least a predetermined distance. The method for calculating the speed of the third transport roller 20 at this time will be described in detail later with reference to a control flow. Setting the aforementioned predetermined distance to be greater than 0 makes it possible for the first print medium 1P and the second print medium 2P to be separated, canceling the state of overlap between the upstream-side end part of the first print medium 1P in the transport direction and the downstream-side leading end of the second print medium 2P in the transport direction.

Through this, a situation where the order of the sheets is rearranged during the discharge and the discharging is hampered can be suppressed.

Note that in canceling the state of overlap, the speed of the third transport roller 20 may be made faster than that of the first transport roller 5, but it is not absolutely necessary for the speed of the third transport roller 20 to be faster than that of the first transport roller 5. When the first transport roller 5 transports the second print medium 2P intermittently for the printing operations, some time is required for the intermittent transport, such as the scanning time of the carriage 1. In this case, the time until the downstream-side end part of the second print medium 2P in the transport direction, which is transported by the first transport roller 5, passes the third transport roller 20, is longer than when the second print medium 2P is not being transported intermittently for the printing operations. The speed of the third transport roller 20 can therefore be reduced. In other words, performing the separation operations during the printing operations makes it possible to reduce the transport speed for the separation and suppress an increase in noise, power consumption, and the like, compared to a case where the separation operations are not performed during the printing operations.

Descriptions will now be given with reference to ST21 in FIG. 12. The printing onto the first surface and the second surface of the first print medium IP has ended, and thus the first print medium P is discharged to a discharge tray 25 by rotating the discharge roller 22 and the third transport roller 20.

Note that after the upstream-side end part of the print medium P in the transport direction passes the flapper 24, the flapper 24 is pivoted in accordance with the processing after the printing on the print medium P that passes the flapper 24 next. The processing after the printing of the second print medium 2P is discharge, and thus the second print medium 2P is transported toward the discharge roller 22 while being guided by the fourth transport path 104. The determination as to whether the upstream-side end part of the print medium Pin the transport direction has passed the flapper 24 may be made based on the rotation amounts of the various rollers, or by a sensor provided separately.

Descriptions will now be given with reference to ST22 in FIG. 12. When the image forming operations for the final line of the second print medium 2P end, the printing onto the first surface and the second surface of the second print medium 2P, which is the final print medium in the one job, ends. Here, the discharge roller 22 and the third transport roller 20, the second transport roller 10, and the first transport roller 5 are rotated in the same direction to discharge the second print medium 2P to the discharge tray 25, thus ending the double-sided printing.

Control Flow

Figure 14A:
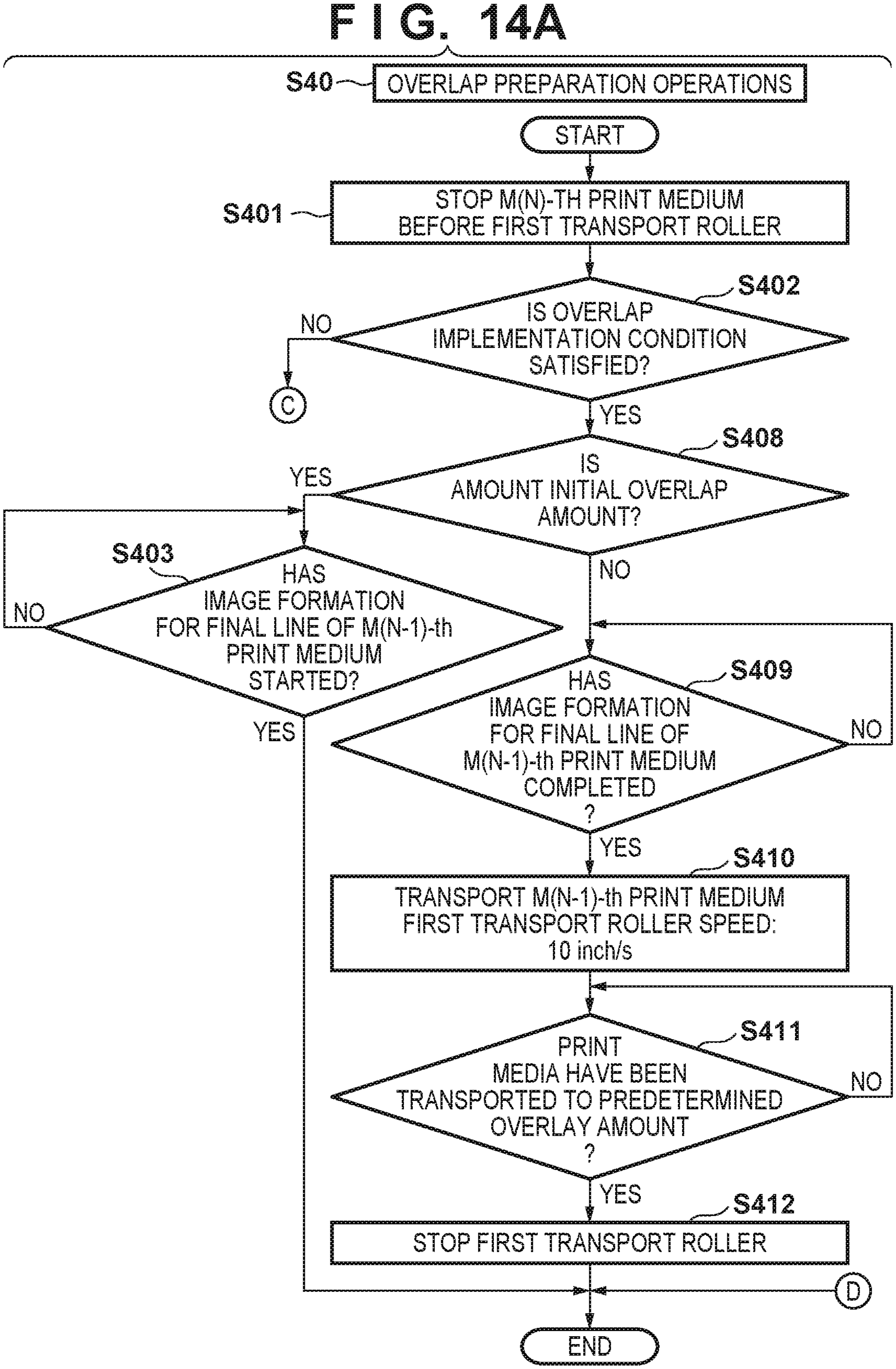
FIGS. 14A and 14B are flowcharts illustrating the overlapping continuous feed operations in the printing processing according to the first embodiment.
Figure 14B:
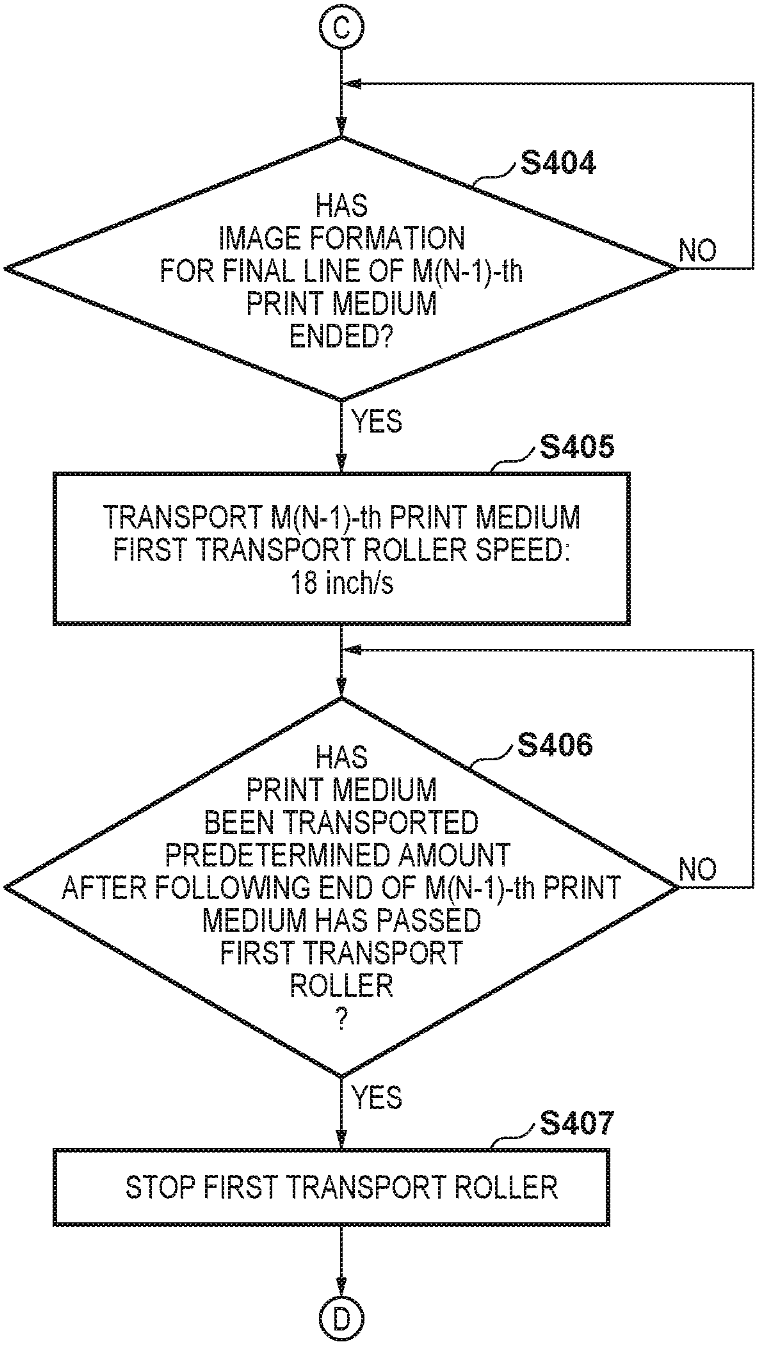
Figure 15:
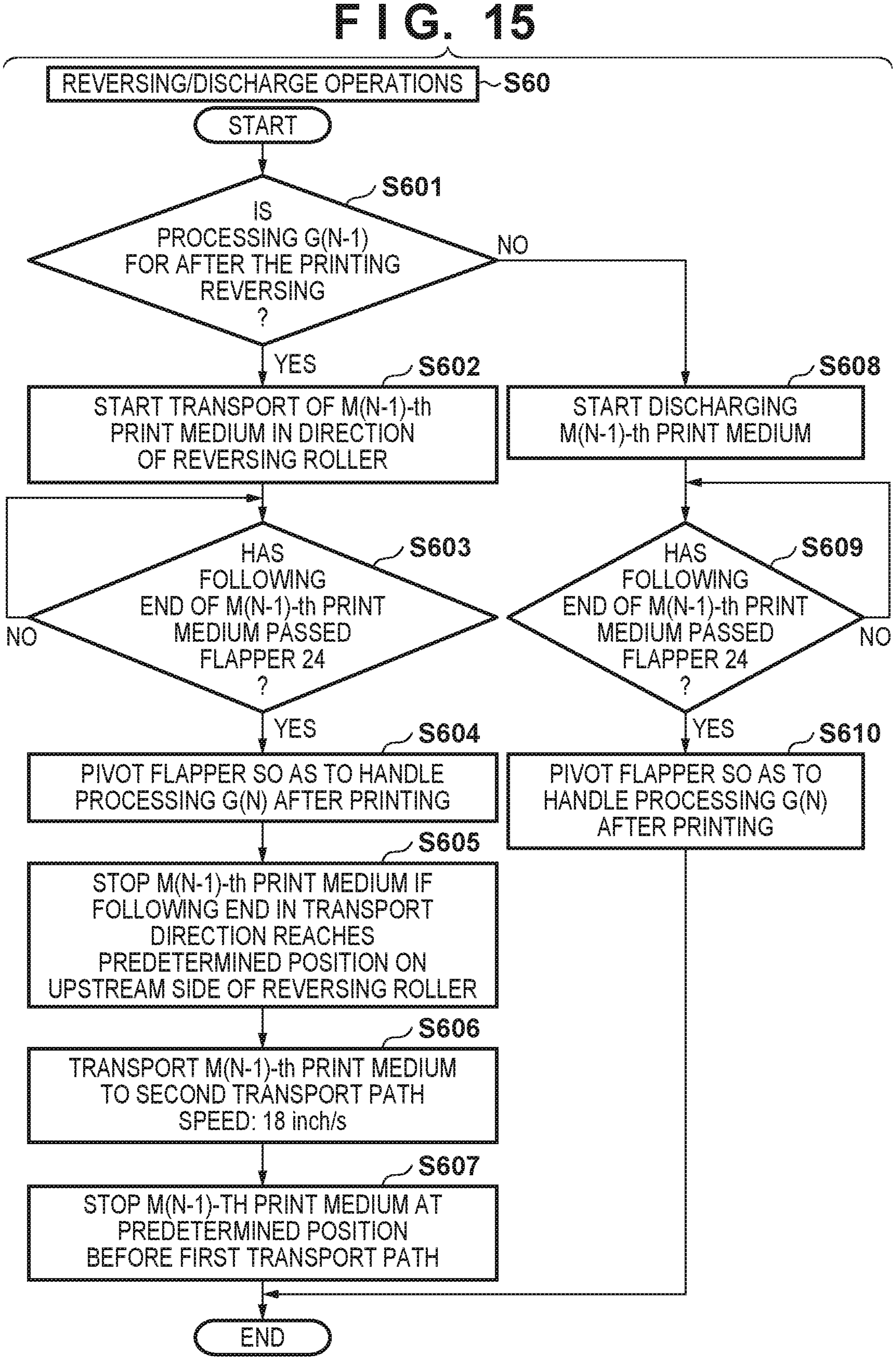
FIG. 15 is a flowchart illustrating the overlapping continuous feed operations in the printing processing according to the first embodiment.

FIGS. 13 to 15 are flowcharts illustrating overlapping continuous feed operations in the printing processing according to the present embodiment. Referring to the table illustrated in FIG. 4, assume that in a printing sequence N, each variable is a function of N, such that when an M(N)-th print medium P is fed from a feed source Q(N), a K (N)-th page of print data is printed onto an F (N)-th surface of the print medium, and processing G (N) is performed after the printing, the maximum printing sequence is Nmax. Note that the printing sequence is merely an example, and the sequence is not limited to that described above. When print data in the double-sided printing mode is transmitted from the host computer 214 via the I/F unit 213, printing operations S30 in the double-sided printing mode start.

Figure 13A:
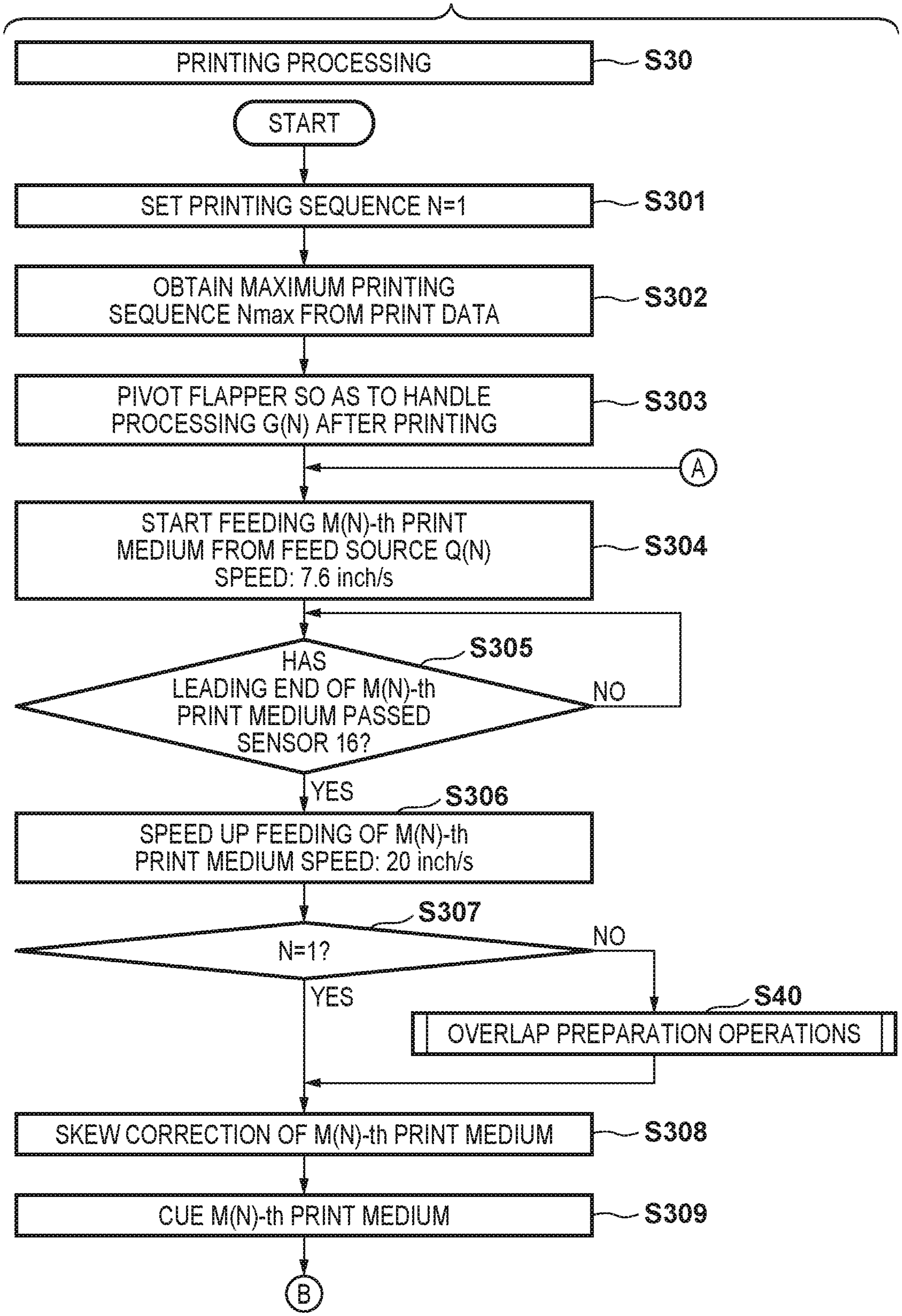
FIGS. 13A and 13B are flowcharts illustrating overlapping continuous feed operations in printing processing according to the first embodiment.

In step S301 in FIG. 13A, the printing sequence N is set to 1 for initialization. In step S302, the maximum printing sequence Nmax is obtained from the print data.

In step S303, the flapper 24 is pivoted by the flapper solenoid 217 in advance to handle the processing G (N) after the printing.

In step S304, feeding of the M(N)-th print medium P from the feed source Q(N) is started at 7.6 inches/sec.

When the feed source Q(N) is the paper loading unit 11, first, the first feed motor 206 is driven at low speed. The pickup roller 2 rotates at 7.6 inches/see as a result. When the pickup roller 2 rotates, the topmost print medium loaded in the paper loading unit 11 is picked up. The first print medium 1P picked up by the pickup roller 2 is transported by the feed roller 3, which is rotating in the same direction as the pickup roller 2. The feed roller 3 is driven by the second feed motor 207, at the same speed as the pickup roller 2. After rotating a predetermined amount such that the print medium P can be transported to a position beyond the feed roller 3, the pickup roller 2 stops so as not to pick up the next print medium P. The pickup roller 2 is a one-way roller, and thus transport by the feed roller 3 can continue even after the pickup roller 2 stops.

When the feed source Q(N) is the second transport path 101, the double-sided transport motor 216 is driven in reverse at low speed, and the second feed motor 207 is driven at low speed as well. As a result, the intermediate roller 15 and the feed roller 3 are rotated at 7.6 inches/sec. Then, the print medium P is transported by the intermediate roller 15 and the feed roller 3 from the second transport path 101 to the first transport path 100 in the direction of the first transport roller 5.

In step S305, it is determined whether the downstream-side end part of the M(N)-th print medium in the transport direction has passed the sensor 16. If that end part is determined not to have passed (step S305: NO), the processing of step S305 is repeated. However, if that end part is determined to have passed (step S305: YES), step S306 is executed.

In step S306, the feed speed for the M(N)-th print medium is switched to 20 inches/sec. At this time, the feed roller 3 is rotated at 20 inches/see as a result of switching the second feed motor 207 to high-speed driving. If a M(N−1)-th print medium is present, this operation is performed to catch up to that print medium.

In step S307, it is determined if Nis 1. If it is determined that Nis 1 (step S307: YES), there can be no print medium P to be overlapped, and the processing therefore moves to step S308. However, if it is determined that N is not 1 (step S307: NO), there is a possibility that overlapping feeding will be performed, and thus overlap preparation operations of step S40 are executed.

When the overlap preparation operations of step S40 indicated in FIGS. 14A and 14B are started, step S401 is executed, where the M(N)-th print medium P is stopped at a predetermined position before the first transport roller 5. The position of the downstream-side leading end of the M(N)-th print medium P in the transport direction is calculated from the rotation amount of the feed roller 3 after the downstream-side leading end of the M(N)-th print medium P in the transport direction is sensed by the print medium sensor 16, and is controlled based on the result of the calculation.

In step S402, it is determined whether a predetermined overlap implementation condition is satisfied. The overlap implementation condition will be described in greater detail later. If the overlap implementation condition is determined to be satisfied (step S402: YES), step S408 is executed. In step S408, it is determined whether the overlap amount set in step S402 is an initial overlap amount. The determination of the initial overlap amount will be described later.

If the overlap amount is determined to be the initial overlap amount (step S408: YES), step S403 is executed. In step S403, it is determined whether image formation for the final line of the M(N−1)-th print medium has started. If it is determined that the image formation has not started (step S403: NO), the processing of step S403 is repeated. If it is determined that the image formation has started (step S403: YES), the processing ends, and step S308 in FIG. 13A is then executed. If the overlap amount is determined not to be the initial overlap amount in step S408 (step S408: NO), step S409 is executed. In step S409, it is determined whether image formation for the final line of the M(N−1)-th print medium has ended. If it is determined that the image formation has not ended (step S409: NO), the processing of step S409 is repeated. If it is determined that the image formation has ended (step S409: YES), step S410 is executed, and the M (N−1)-th print medium P is transported at 10 inches/see using the first transport roller 5.

In step S411, it is determined whether the print media have been transported until the overlap amount between the following end of the M(N−1)-th print medium and the leading end of the M(N)-th print medium reaches the overlap amount set in step S402. If it is determined that the print media have not been transported to the predetermined overlap amount (step S411: NO), the processing of step S411 is repeated. If it is determined that the print media have been transported to the predetermined overlap amount (step S411: YES), step S412 is executed, and the first transport roller 5 is stopped. The processing ends, and step S308 in FIG. 13A is then executed.

On the other hand, if it is determined that the overlap implementation condition is not satisfied in step S402 (step S402: NO), step S404 is executed. By executing steps S404 to S407 (described later) in order, operations for canceling the state of overlap upstream from the first transport roller 5 in the transport direction, or operations for when the M(N)-th print medium P has not sufficiently caught up to the M(N−1)-th print medium P, can be performed.

In step S404, it is determined whether image formation for the final line of the M(N−1)-th print medium has ended. If it is determined that the image formation has not ended (step S404: NO), the processing of step S404 is repeated. If it is determined that the image formation has ended (step S404: YES), step S405 is executed, and the M(N−1)-th print medium P is transported at 18 inches/see using the first transport roller 5.

In step S406, after the following end of the M(N−1)-th print medium P has passed the first transport roller 5, it is determined whether the print medium P has been transported a predetermined amount. If it is determined that the print medium P has not been transported the predetermined amount (step S406: NO), the processing of step S406 is repeated. If it is determined that the print medium P has been transported the predetermined amount (step S406: YES), step S407 is executed, and the first transport roller 5 is stopped. The processing ends, and step S308 in FIG. 13A is then executed.

By executing the above-described steps S404 to S407 in order, a state of overlap can be canceled upstream from the first transport roller 5 in the transport direction in the event that there is a state of overlap but the state does not satisfy the overlap implementation condition. Additionally, when the M(N)-th print medium P has not sufficiently caught up to the M(N−1)-th print medium P, preparations for correcting skew can be performed independently for the M(N)-th print medium P.

In step S308, skew of the M(N)-th print medium Pis corrected. When the first transport roller 5 is stopped, the skew correction operations for the M(N)-th print medium P are performed by driving the feed roller 3 to cause the downstream-side leading end of the M(N)-th print medium P in the transport direction to contact the transport nip part. At this time, if N is determined to be 1 in step S307 (step S307: YES), skew of the M(N)-th print medium P is corrected independently. If it is determined in step S402 that the overlap implementation condition is satisfied (step S402: YES), the skew is corrected with the M(N)-th print medium P overlapping the M(N−1)-th print medium P. On the other hand, if it is determined in step S402 that the overlap implementation condition is not satisfied (step S402: NO), skew of the M(N)-th print medium Pis corrected independently.

In step S309, the M(N)-th print medium Pis cued. The M(N)-th print medium P can be cued by rotating the first transport roller 5 a predetermined amount. At this time, if the skew is corrected with the M(N)-th print medium P overlapping the M(N−1)-th print medium P in step S308, the cueing is performed while maintaining that state of overlap.

In step S310, the feed speed for the M(N)-th print medium is switched to 7.6 inches/sec. The feed roller 3 is rotated at 7.6 inches/see as a result of switching the second feed motor 207 to low-speed driving.

In step S311, printing operations are started for the K (N)-th page of data on the F (N)-th surface of the M(N)-th print medium P. When the M(N)-th print medium P is transported by the first transport roller 5 intermittently by a predetermined amount at a time, the feed roller 3 is also driven intermittently by the second feed motor 207. When the M(N)-th print medium P is transported intermittently for the printing operations, the M(N−1)-th print medium P is also transported intermittently.

In step S312, it is determined if N is 1. If it is determined that Nis 1 (step S312: YES), step S313 is executed. On the other hand, if it is determined that N is not 1 (step S312: NO), step S316 is executed.

In step S316, it is determined whether overlapping feeding has been performed. If it is determined that overlapping feeding has been performed (step S316: YES), the separation operations of step S50 are executed. The separation operations will be described in greater detail later. After step S50 is executed, the reversing/discharge operations of step S60 in FIG. 15 are executed. If it is determined that overlapping feeding has not been performed (step S316: NO), the reversing/discharge operations of step S60 in FIG. 15 are executed without executing the separation operations of step S50.

When the reversing/discharge operations of step S60 in FIG. 15 are started, step S601 is executed. In step S601, it is determined whether the processing G (N−1) for after the printing is reversing. If the processing is determined to be reversing (step S601: YES), step S602 is executed, and the M(N−1)-th print medium P is transported toward the reversing roller 9 while rotating the reversing roller 9.

In step S603, it is determined whether the upstream-side end part of the M(N−1)-th print medium P in the transport direction has passed the flapper 24. The determination as to whether the end part has passed the flapper 24 may be made based on the rotation amounts of the various rollers, or by a sensor provided separately. If that end part is determined not to have passed the flapper 24 (step S603: NO), the processing of step S603 is repeated. If that end part is determined to have passed the flapper 24 (step S603: YES), step S604 is executed.

In step S604, the flapper 24 pivots so as to handle the processing G (N) after the printing. In step S601, the processing G (N) after the printing is determined to be reversing, and thus the flapper 24 is pivoted to enable transport toward the reversing roller 9.

Figure 13B:
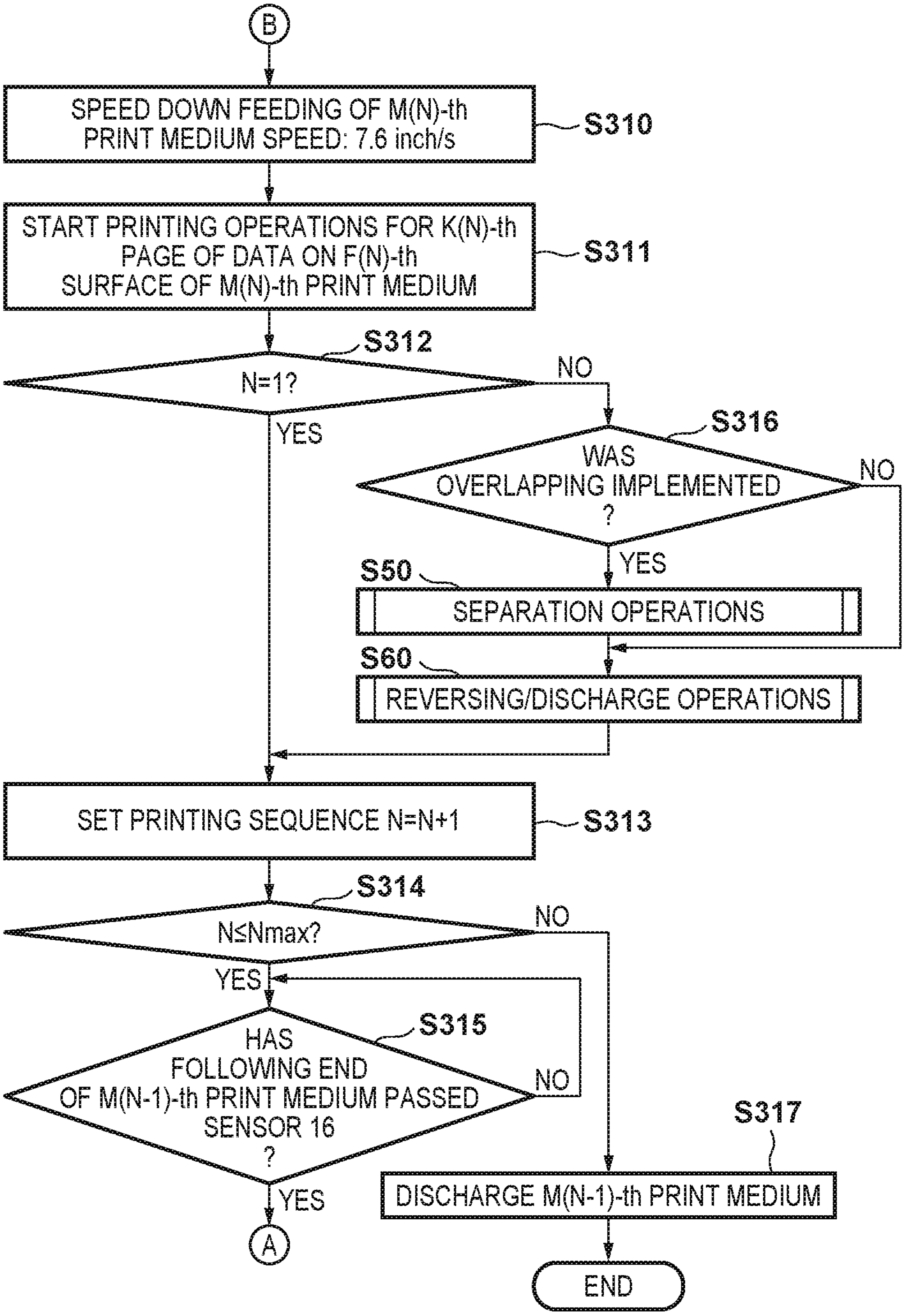

In step S605, the M(N−1)-th print medium Pis continuously transported until the upstream-side end part thereof in the transport direction reaches a predetermined position on the upstream side of the reversing roller 9 in the transport direction, and then stops. In step S606, the M(N−1)-th print medium P is transported toward the second transport path 101. Switching the double-sided transport motor 216 to high-speed driving in the reverse direction results in the reversing roller 9 and the intermediate roller 15 being rotated at 18 inches/see in the direction of the arrow B in STF in FIG. 2. Thereafter, in step S607, the M(N-1)-th print medium P is stopped upon the downstream-side leading end of the print medium P in the transport direction reaching a predetermined position before the first transport path 100. The aforementioned predetermined position at this time is also calculated based on the rotation amount of the transport roller since the start of the cueing operations and the length of the sheets. When step S607 ends, step S313 in FIG. 13B is executed.

On the other hand, if it is determined in step S601 in FIG. 15 that the processing G (N−1) after the printing is not reversing (step S601: NO), step S608 is executed, and the M(N−1)-th print medium P is discharged to the discharge tray 25 by rotating the discharge roller 22 and the third transport roller 20.

In step S609, it is determined whether the upstream-side end part of the M (N−1)-th print medium P in the transport direction has passed the flapper 24 during discharge. The determination as to whether the end part has passed the flapper 24 may be made based on the rotation amounts of the various rollers, or by a sensor provided separately. If that end part is determined not to have passed the flapper 24 (step S609: NO), the processing of step S609 is repeated. If that end part is determined to have passed the flapper 24 (step S609: YES), step S610 is executed.

In step S610, the flapper 24 pivots so as to handle the processing G (N) after the printing. In step S601, the processing G (N) after the printing is determined not to be reversing, and thus discharge is performed. The flapper 24 is therefore pivoted to enable transport toward the discharge roller 22. When step S610 ends, step S313 in FIG. 13B is executed.

In step S313 in FIG. 13B, the printing sequence N is incremented to N+1.

In step S314, it is determined whether the printing sequence N is less than or equal to the maximum printing sequence Nmax. If the printing sequence N is determined to be less than or equal to the maximum printing sequence Nmax (step S314: YES), step S315 is executed. In step S315, it is determined whether the upstream-side end part of the M(N−1)-th print medium P in the transport direction has passed the sensor 16. If it is determined that the end part has passed the sensor 16 (step S315: YES), the processing returns to step S304, where paper feed operations are performed, and control is then performed thereafter through a similar flow.

Figure 16:
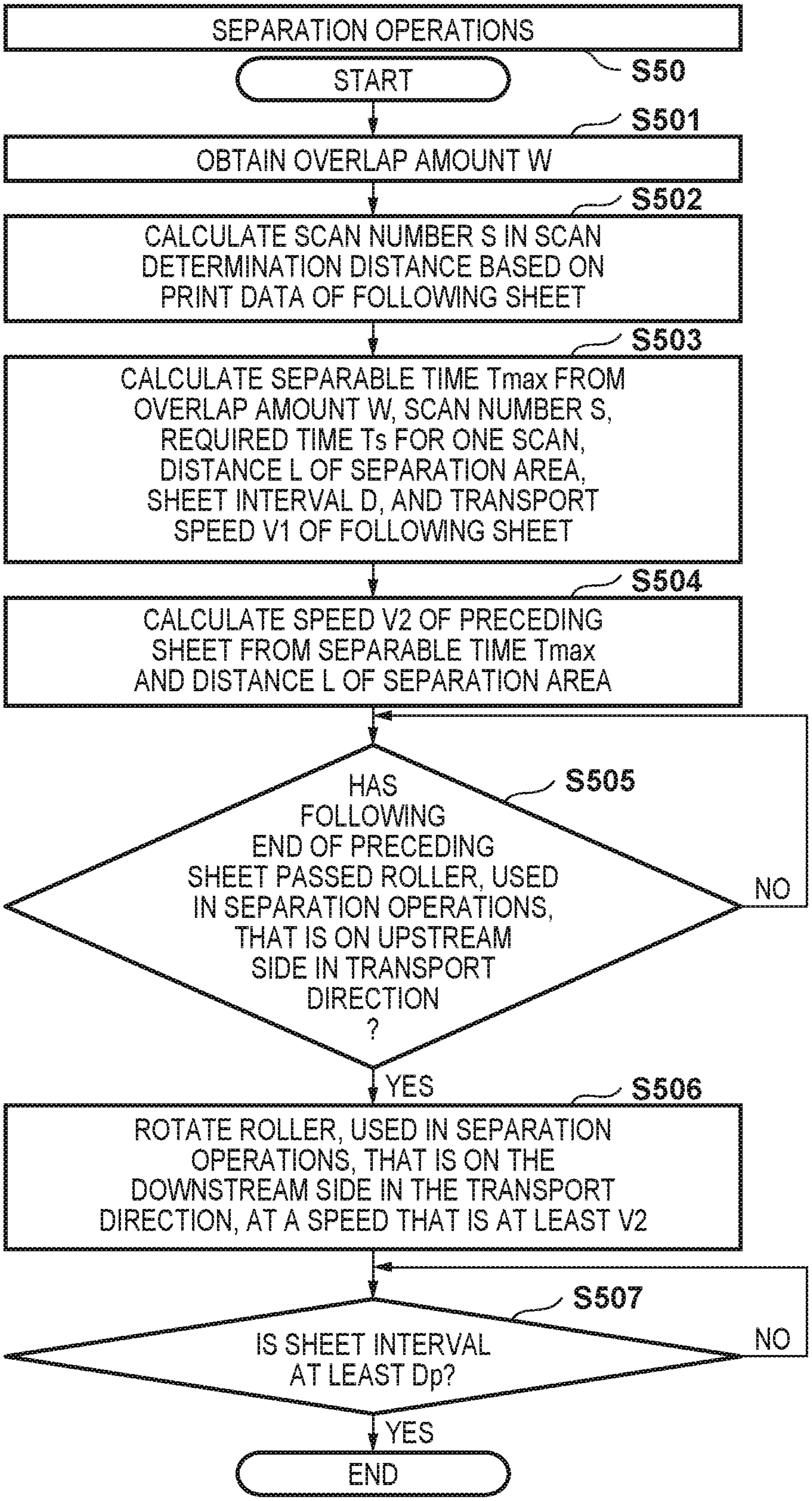
FIG. 16 is a flowchart illustrating separation operations according to the first embodiment.
Figure 17:
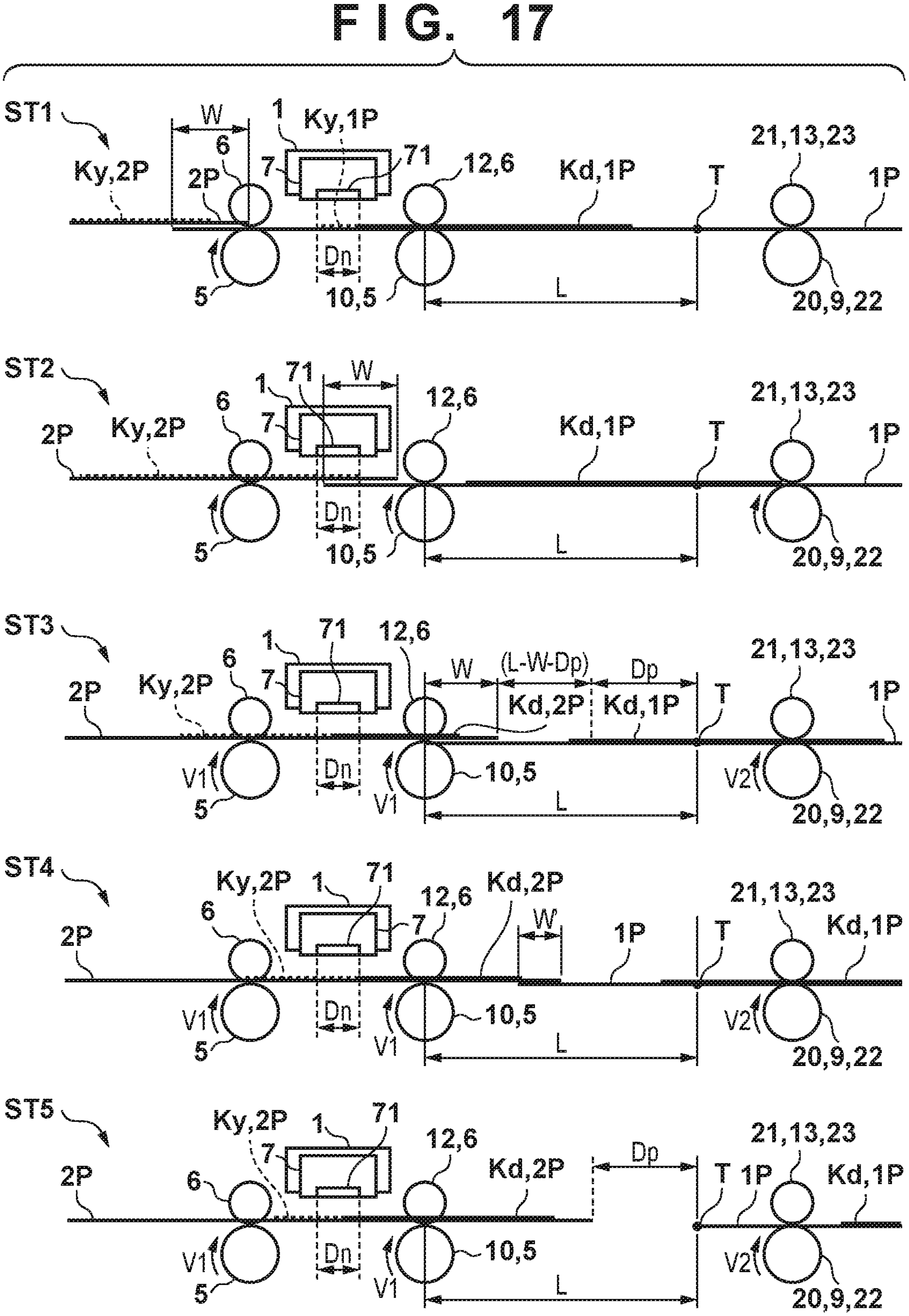
FIG. 17 is a conceptual diagram illustrating separation operations according to the first embodiment.

On the other hand, if in step S314 it is determined that the printing sequence N is not less than or equal to the maximum printing sequence Nmax (step S314: NO), the final printing is determined to have ended, and step S317 is executed. In step S317, the M(N−1)-th print medium P is discharged. The M (N−1)-th print medium P can be discharged to the discharge tray 25 by rotating the discharge roller 22 and the third transport roller 20, the second transport roller 10, and the first transport roller 5 in the same direction. The processing ends once the discharge is complete. Separation Operations FIG. 16 is a control flowchart illustrating the separation operations. FIG. 17 is a conceptual diagram illustrating relationships between variables, which will be described later. Operations for separating the preceding print medium and the following print medium, which are in an overlapping state as described with reference to FIGS. 5 to 12, will be described next.

FIG. 17 is a conceptual diagram illustrating relationships between variables (described later) in operations for separating the preceding first print medium IP from the following second print medium 2P. The separation operations use two rollers. In the present embodiment, the second transport roller 10 is on the upstream side in the transport direction, and the third transport roller 20 is on the downstream side.

ST1 in FIG. 17 indicates a state in which skew correction is being performed for the following print medium P in step S308 in FIG. 13A. As described with reference to ST6 in FIG. 6, when the first transport roller 5 is stopped to perform the image forming operations (ink ejection operations) for the final line of the first print medium IP, the skew correction operations for the second print medium 2P are performed to cause the leading end of the second print medium 2P to contact the transport nip part. At this time, the first print medium 1P and the second print medium 2P overlap by an overlap amount W. In FIG. 17, Ky indicates a planned printing area on the print medium P, and Kd indicates a printed area. Additionally, Dn indicates a nozzle area distance, which is the distance of an area of ejection nozzles 71 provided in the print head 7 from the furthest upstream to the furthest downstream, i.e., a maximum printing width during printing. Accordingly, if the printing width for each scan operation of the carriage 1 is represented by Ds, Ds≤Dn. Additionally, the printing width need not be constant, and may instead differ from scan operation to scan operation.

In ST2 in FIG. 17, as described with reference to ST7 in FIG. 7, when the image forming operations for the final line of the first print medium P end, the second print medium 2P can be cued by rotating the first transport roller 5 by a predetermined amount and keeping the second print medium 2P in a state of overlap on the first print medium 1P by the overlap amount W. In the present embodiment, the cueing is performed such that the furthest downstream part of a planned printing area Ky of the second print medium P coincides with the furthest downstream ejection nozzle of the print head 7.

Descriptions will now be given with reference to ST3 in FIG. 17. The separation operations are started after the upstream-side end part of the preceding first print medium 1P in the transport direction passes the upstream-side roller used in the separation operations. The present embodiment will describe a case where, as indicated by ST3 in FIG. 17, the separation operations are started immediately after the upstream-side end part of the preceding first print medium 1P in the transport direction passes the upstream-side roller used in the separation operations. Note that the timing of the start is not limited to immediately after the passage, and may be any timing after the passage. The separation operations are controlled to end before the upstream-side end part of the preceding print medium P in the transport direction passes a given point T. In the present embodiment, the point T coincides with the third transport roller 20. In other words, the operations are controlled to end before the upstream-side end part of the preceding print medium P in the transport direction passes the third transport roller 20.

The area from the upstream-side roller used in the separation operations to the point T is taken as a separation area, and the distance thereof is represented by L. A sheet interval between the upstream-side end part of the preceding print medium P in the transport direction and the downstream-side end part of the following print medium P in the transport direction after the separation operations is represented by Dp. At this time, a distance (L−W−Dp) is taken as a scan determination distance, which is referenced in the calculation of a scan number S when printing onto the following print medium P.

A control flowchart of the separation operations will be described with reference to FIG. 16. In step S501 in FIG. 16, the MPU 201 obtains the overlap amount W. In step S502, the MPU 201 calculates the scan number S for the period when the downstream-side end part of the following print medium P in the transport direction traverses the scan determination distance (L−W−Dp), based on the print data printed onto the following print medium P.

In step S503, the MPU 201 calculates a separable time Tmax. This is calculated based on the overlap amount W, the scan number S, a required time Ts for one scan, the distance L of the separation area, the sheet interval Dp after the separation operations, and a transport speed V1 of the following print medium P. Specifically, the calculation is performed using the following formula.

$$T\max=(L-W-Dp)/V1+STs$$

Figure 25:
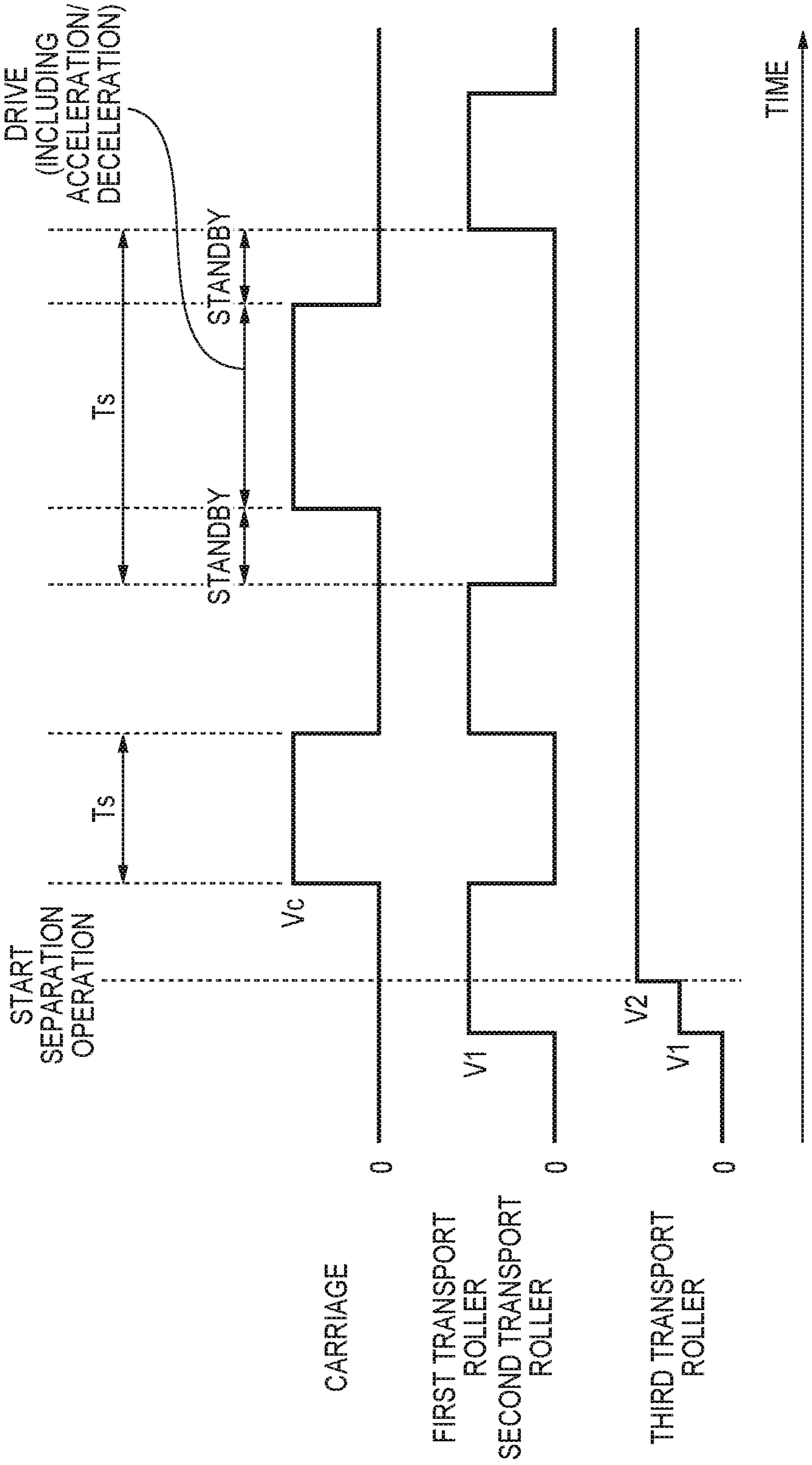
FIG. 25 is a timing chart illustrating separation operations.

The transport speed V1 of the following print medium P is, in the present embodiment, the transport speed of the second transport roller 10. Note that the required time Ts for one scan is the length of time required for the carriage 1 to perform the scan operation indicated in the timing chart in FIG. 25. Ts may include standby time before and after the operations, acceleration/deceleration time, and the like. If the time required for the carriage 1 to perform the scan operations differs for each instance of driving, an average value may be used for Ts. Note that "Vc" in FIG. 25 represents the drive speed of the carriage 1.

In step S504, the MPU 201 calculates a speed V2 of the preceding print medium P for the separation operations. This is calculated through the following formula, based on the separable time Tmax and the distance L of the separation area.

$$V2=L/T\max$$

In step S505, the MPU 201 determines whether the upstream-side end part of the preceding print medium P in the transport direction has passed the roller, used in the separation operations, that is on the upstream side in the transport direction. In the present embodiment, it is determined whether the end part has passed the second transport roller 10. If that end part is determined not to have passed (step S505: NO), the processing of step SSOS is repeated. On the other hand, if that end part is determined to have passed (step S505: YES), the processing moves to step S506.

In step S506, the roller, used in the separation, that is on the downstream side in the transport direction, is rotated at a speed that is at least V2. In the present embodiment, the third transport roller 20 is rotated. As a result of these operations, the preceding print medium P is separated from the following print medium P, and the overlap amount W decreases to W', as indicated by ST4 in FIG. 17. At this time, by rotating at a speed that is at least V2, a sheet interval that is at least the sheet interval Dp can be provided before the downstream-side end part of the following print medium P in the transport direction passes the third transport roller 20, which makes it possible to cancel the state of overlap, as indicated by ST5 in FIG. 17.

In step S507, the MPU 201 determines whether the interval between the upstream-side end part of the preceding print medium P in the transport direction and the downstream-side end part of the following print medium P in the transport direction is at least the sheet interval Dp after the separation operations. If the interval is determined to be lower than a predetermined amount (step S507: NO), the processing of step S507 is repeated. On the other hand, if the interval is determined to be at least the sheet interval Dp (step S507: YES), the separation operations are determined to be complete, and the processing ends.

With respect to the sheet interval Dp, Dp=0 in the present embodiment, and setting Dp=0 makes it possible to cancel the state of overlap. Accordingly, the possibility of paper jams occurring when switching the transport path using the flapper 24, the possibility of the discharge of sheets worsening, and the like can be reduced. It is desirable that the value of the sheet interval Dp be set to a value greater than the transport amount by which the print medium is transported during the pivoting of the flapper 24. In consideration of the speed at which sheets fall during discharge, it is desirable that the value be high enough not to degrade the alignment of sheets during the discharge.

However, Dp can also be set to be less than 0. In this case, the state of overlap will not be completely canceled, but the overlap amount is reduced, and the value by which the flapper can pivot, the value at which the preceding and following sheets do not switch order when the paper is discharged, and the like are determined experimentally and set. Accordingly, the possibility of paper jams occurring when switching the transport path using the flapper 24, the possibility of the discharge of sheets worsening, and the like can be reduced.

Note that a separable time T'max when the separation operations are not performed during the scan operations of the carriage 1 is:

$$T'\max=(L-W-Dp)/V1$$

As such, a speed V'2 of the preceding print medium P during the separation operations is:

$$V'2=L/T'\max$$

At this time, $$T\max>T'\max$$

holds true, and thus $$V2<V'2$$

holds true as well. In other words, performing the separation operations during the printing operations makes it possible to reduce the transport speed for the separation and suppress an increase in noise, power consumption, and the like, compared to a case where the separation operations are not performed during the printing operations.

V2 can be reduced when the time STs required for S number of scan operations is high. A separate standby time unrelated to the scanning operation may also be provided. In this case, the transport speed can be further reduced, and increases in noise and power consumption can be suppressed.

When canceling the state of overlap, the speed of the roller, used in the separation operations, that is on the downstream side in the transport direction, may be faster than the roller on the upstream side of the separation area in the transport direction, but does not necessarily have to be faster, and may be similar or slower, depending on the result of calculating V2.

Additionally, the roller, used in the separation operations, that is on the downstream side in the transport direction need not be driven continuously at a constant speed that is at least V2, and may, for example, be controlled such that an average speed, including stops and acceleration/deceleration, is at least V2.

Furthermore, if it is determined in step S507 that the interval between the upstream-side end part of the preceding print medium P in the transport direction and the downstream-side end part of the following print medium P in the transport direction is at least the sheet interval Dp after the separation operations (step S507: YES), the separation operations are determined to be complete and the processing is ended, but another condition for ending may be provided as well. For example, the processing may end when the upstream-side end part of the preceding print medium P in the transport direction reaches the third transport roller 20.

If the separation operations are being performed at a higher speed than V2 at this time, the sheet interval can be broadened further.

Overlapping Operations

Figure 18:
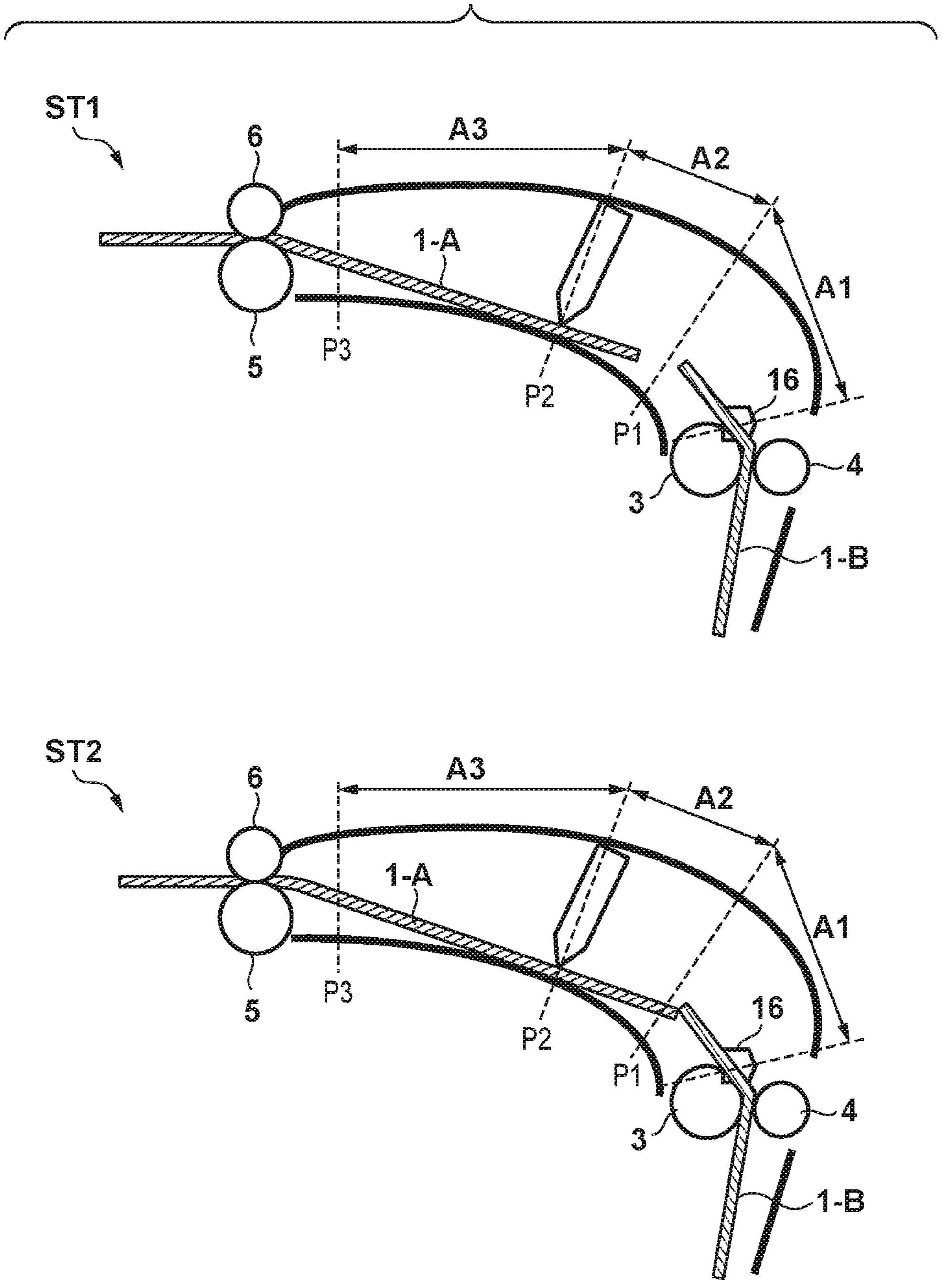
FIG. 18 is a diagram illustrating operations for causing a following sheet to overlap with a leading sheet.
Figure 19:
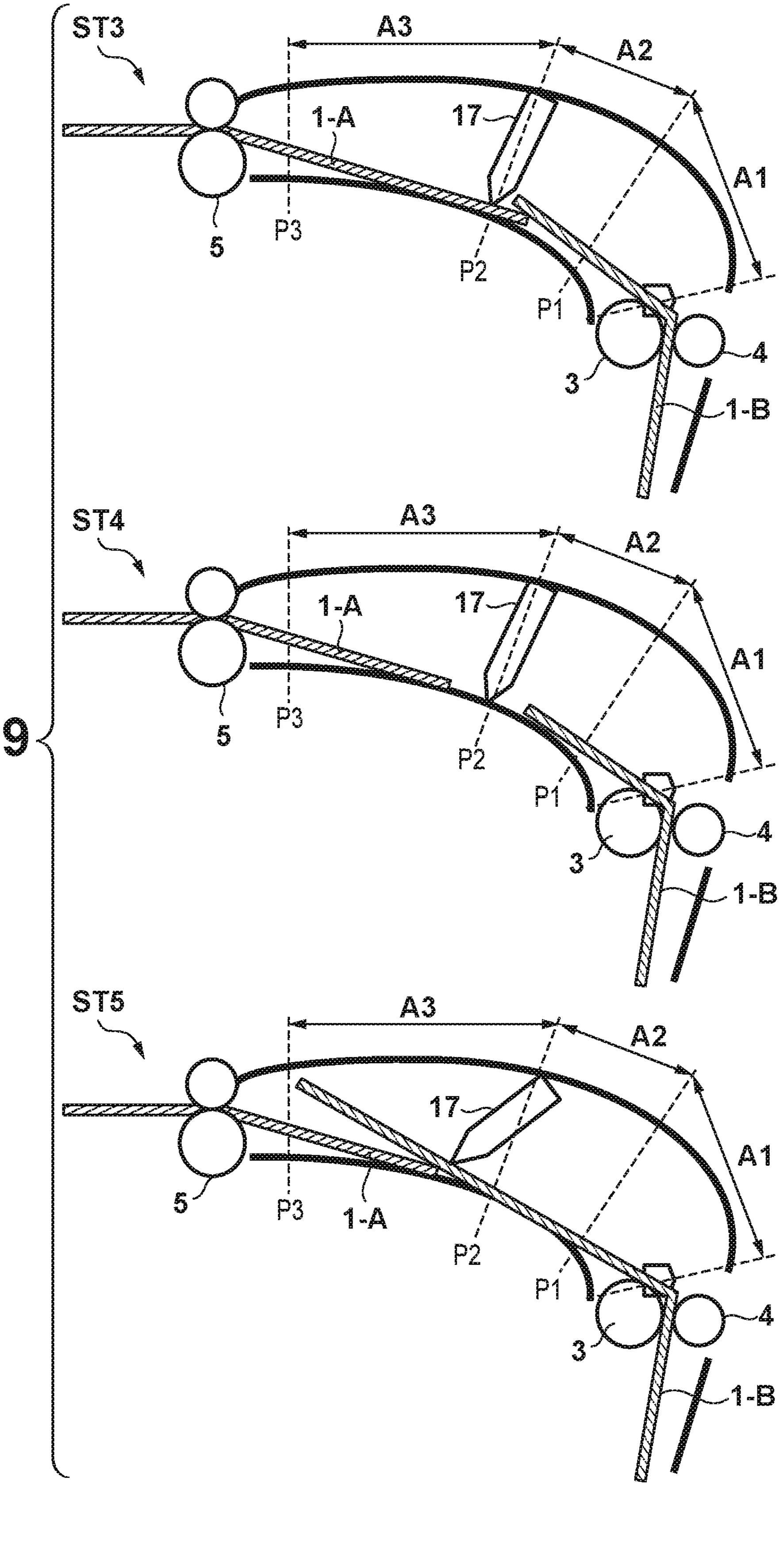
FIG. 19 is a diagram illustrating operations for causing a following sheet to overlap with a leading sheet.

FIGS. 18 and 19 are diagrams illustrating operations for causing the preceding print medium and the following print medium to overlap according to the present embodiment. Operations for creating a state of overlap described in FIGS. 5 to 12, in which the leading end part of the following print medium overlaps the following end part of the preceding print medium, will be described here.

FIGS. 18 and 19 are enlarged views of the area between the feed nip part formed by the feed roller 3 and the feed driven roller 4, and the transport nip part formed by the first transport roller 5 and the pinch roller 6. The descriptive diagrams in the present embodiment will illustrate a configuration which includes a print medium holding lever that suppresses lifting of the following end part of the print medium P.

The process through which the print medium is transported by the first transport roller 5 and the feed roller 3 will be described as three states in order. The first state, in which operations are performed for the following print medium to follow the preceding print medium, will be described with reference to ST1 and ST2 in FIG. 18. The second state, in which operations are performed for causing the following print medium to overlap the preceding print medium, will be described with reference to ST3 and ST4 in FIG. 19. The third state, in which it is determined whether skew correction operations are performed for the following print medium while maintaining the state of overlap, will be described with reference to ST5 in FIG. 19.

In ST1 in FIG. 18, the feed roller 3 is controlled to transport the following print medium P, and the leading end of the following print medium Pis sensed by the print medium sensor 16. A section from the print medium sensor 16 to a position P1 where the following print medium P can be caused to overlap the preceding print medium P is defined as a first section A1. In the first section A1, operations are performed for the leading end of the following print medium P to follow the following end of the preceding print medium P. P1 is determined according to the configuration of the mechanism, In the first state, there are cases where the operations for following are stopped in the first section A1. As indicated by ST2 in FIG. 18, the operations for causing the following print medium to overlap the preceding print medium are not performed when the leading end of the following print medium P overtakes the following end of the preceding print medium P before P1.

In ST3 in FIG. 19, a section from the aforementioned P1 to a position P2 where a print medium holding lever 17 is provided is defined as a second section A2. Operations for causing the following print medium P to overlap the preceding print medium P are performed in the second section A2.

In the second state, in the second section A2, there are cases where the operations for causing the following print medium to overlap the preceding print medium are stopped. As indicated by ST4 in FIG. 19, the operations for causing the following print medium to overlap the preceding print medium cannot be performed if the leading end of the following print medium P catches up with the following end of the preceding print medium P in the second section A2.

In ST5 in FIG. 19, a section from the aforementioned P2 to P3 is defined as a third section A3. P3 is, for example, the position of the leading end of the following print medium upon stopping in step S401 in FIG. 14A. The print media are transported with the following print medium P overlapping the preceding print medium P until the leading end of the following print medium P reaches P3. In the third section A3, it is determined whether to bring the following print medium P into contact with the transport nip part for cueing while maintaining the state of overlap. In other words, it is determined whether to perform the cueing after the skew correction operations while maintaining the state of overlap, or perform the cueing after the skew correction operations having canceled the state of overlap.

Overlapability Determination

Figure 20:
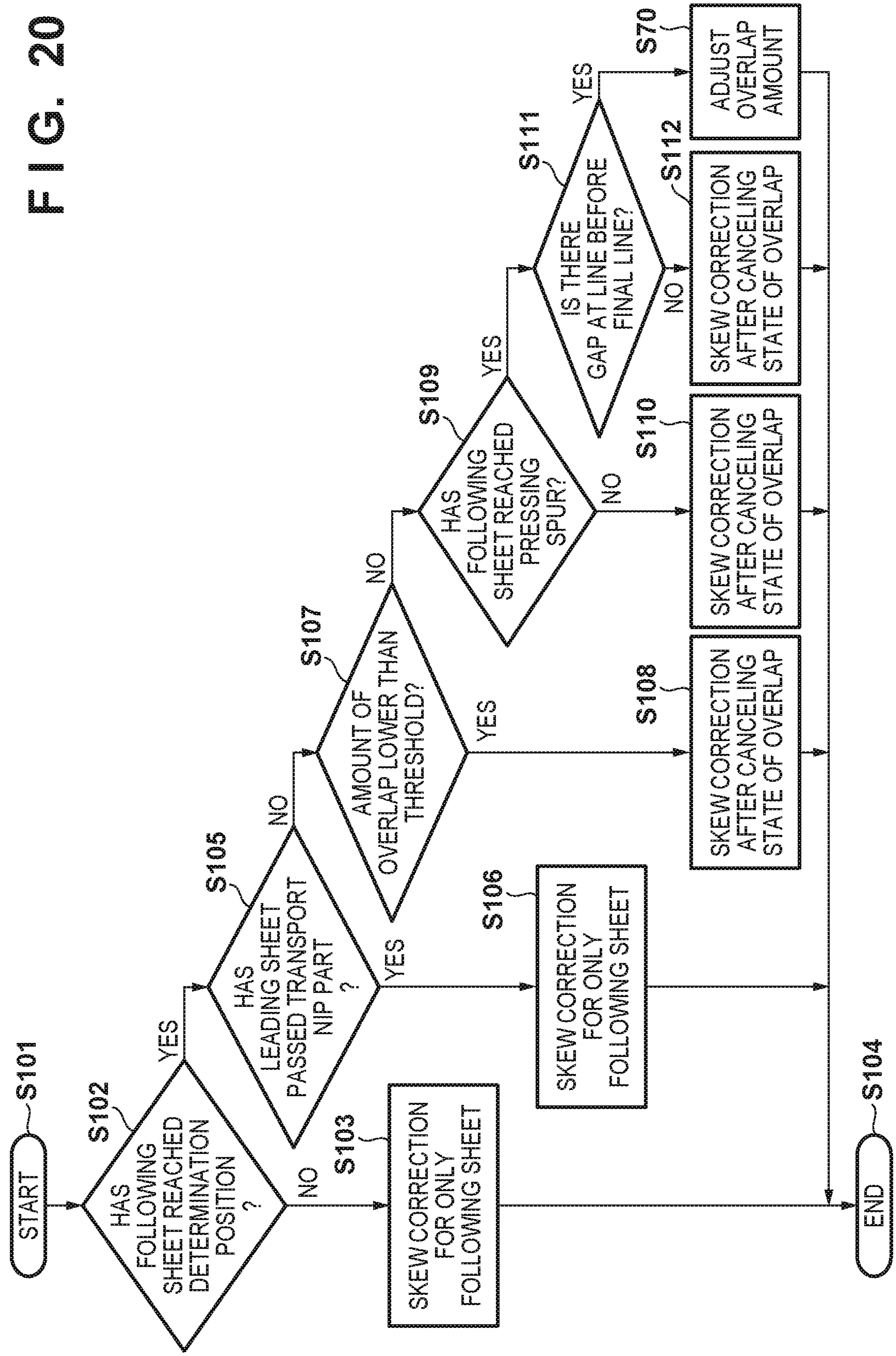
FIG. 20 is a flowchart illustrating an overlapability determination according to the first embodiment.

FIG. 20 is a flowchart illustrating skew correction operations for the following print medium according to the present embodiment. The determination as to whether the overlap implementation condition is satisfied, described in S402 in FIG. 14A, will be described in detail here.

Operations will be described for determining whether to (i) perform the skew correction operations by bringing the leading end of the following print medium P into contact with the transport nip part while maintaining the overlap amount between the preceding print medium P and the following print medium P at the initial overlap amount, (ii) perform the skew correction operations by bringing the leading end of the following print medium into contact with the transport nip part at an overlap amount smaller than the initial overlap amount, or (iii) perform the skew correction operations by bringing the leading end of the following print medium P into contact with the transport nip part after canceling the state of overlap between the preceding print medium P and the following print medium P.

The processing starts at step S101. In step S102, it is determined whether the leading end of the following print medium P has reached a determination position (FIG. 19: P3 in ST5). If the leading end has not reached the determination position (step S102: NO), it is unclear whether the leading end of the following print medium P will contact the transport nip part by being transported by a predetermined amount, and it is therefore determined that the skew correction operations will be performed for the following print medium only (step S103), after which the determination operations end (step S104). In other words, after the following end of the preceding print medium P passes the transport nip part, only the following print medium Pis transported and brought into contact with the transport nip part to perform the skew correction operations, and the cueing is then performed for only the following print medium P.

On the other hand, if the leading end of the following print medium P has reached the determination position P3 (step S102: YES), it is determined whether the following end of the preceding print medium P has passed the transport nip part (step S105). If it is determined that the following end has passed the transport nip part (step S105: YES), the preceding print medium and the following print medium are not overlapping, and it is therefore determined that the skew correction operations are performed for only the following print medium (step S106). In other words, the skew correction operations are performed by bringing only the following print medium P into contact with the transport nip part, and the cueing is then performed for only the following print medium P.

On the other hand, if it is determined that the following end of the preceding print medium P has not passed the transport nip part (step S105: NO), it is determined whether the amount of overlap between the following end part of the preceding print medium P and the leading end part of the following print medium P is lower than a threshold (step S107). The position of the following end of the preceding print medium P is updated as the printing operations on the preceding print medium P progress. The position of the leading end of the following print medium P is the aforementioned determination position. In other words, the amount of overlap decreases as the printing operations for the preceding print medium P progress. If the amount of overlap is determined to be lower than the threshold (step S107: YES), a determination is made to cancel the state of overlap and perform the skew correction operations only for the following print medium (step S108). In other words, the following print medium P is not transported with the preceding print medium P after the image forming operations for the preceding print medium P are complete. Specifically, the preceding print medium P is transported by the first transport roller 5 being driven by the transport motor 205. However, the feed roller 3 is not driven. The state of overlap is canceled as a result. Furthermore, the skew correction operations are performed by bringing only the following print medium P into contact with the transport nip part, and the cueing is then performed for only the following print medium P.

If the amount of overlap is determined to be at least the threshold (step S107: NO), it is determined whether the following print medium P will reach the spur (not shown) when the following print medium Pis cued (step S109). The spur (not shown) is a spur which rotates by making contact with the printing surface of the printed sheet which has been printed onto by the print head 7, and is positioned upstream from the spur 12 in the transport direction. The spur (not shown) is a spur for preventing the printed sheet from lifting, and is also called a holding spur. If it is determined that the following print medium P will not reach the spur (not shown) (step S109: NO), a determination is made to cancel the state of overlap and perform the skew correction operations only for the following print medium (step S110). In other words, the following print medium P is not transported with the preceding print medium P after the image forming operations for the preceding print medium P are complete. Specifically, the preceding print medium P is transported by the first transport roller 5 being driven by the transport motor 205. However, the feed roller 3 is not driven. The state of overlap is canceled as a result. Furthermore, the skew correction operations are performed by bringing only the following print medium P into contact with the transport nip part, and the cueing is then performed for only the following print medium P.

If it is determined that the following print medium P will reach the spur (not shown) (step S109: YES), it is determined whether there is a gap between the final line of the preceding print medium and the previous line before that final line (step S111). If it is determined that there is no gap (step S111: NO), a determination is made to cancel the state of overlap and perform the skew correction operations only for the following print medium (step S112). If it is determined that there is a gap (step S111: YES), the overlap amount adjustment operations of step S70 in FIG. 21 are performed.

Overlap Amount Adjustment Operations

Figure 21:
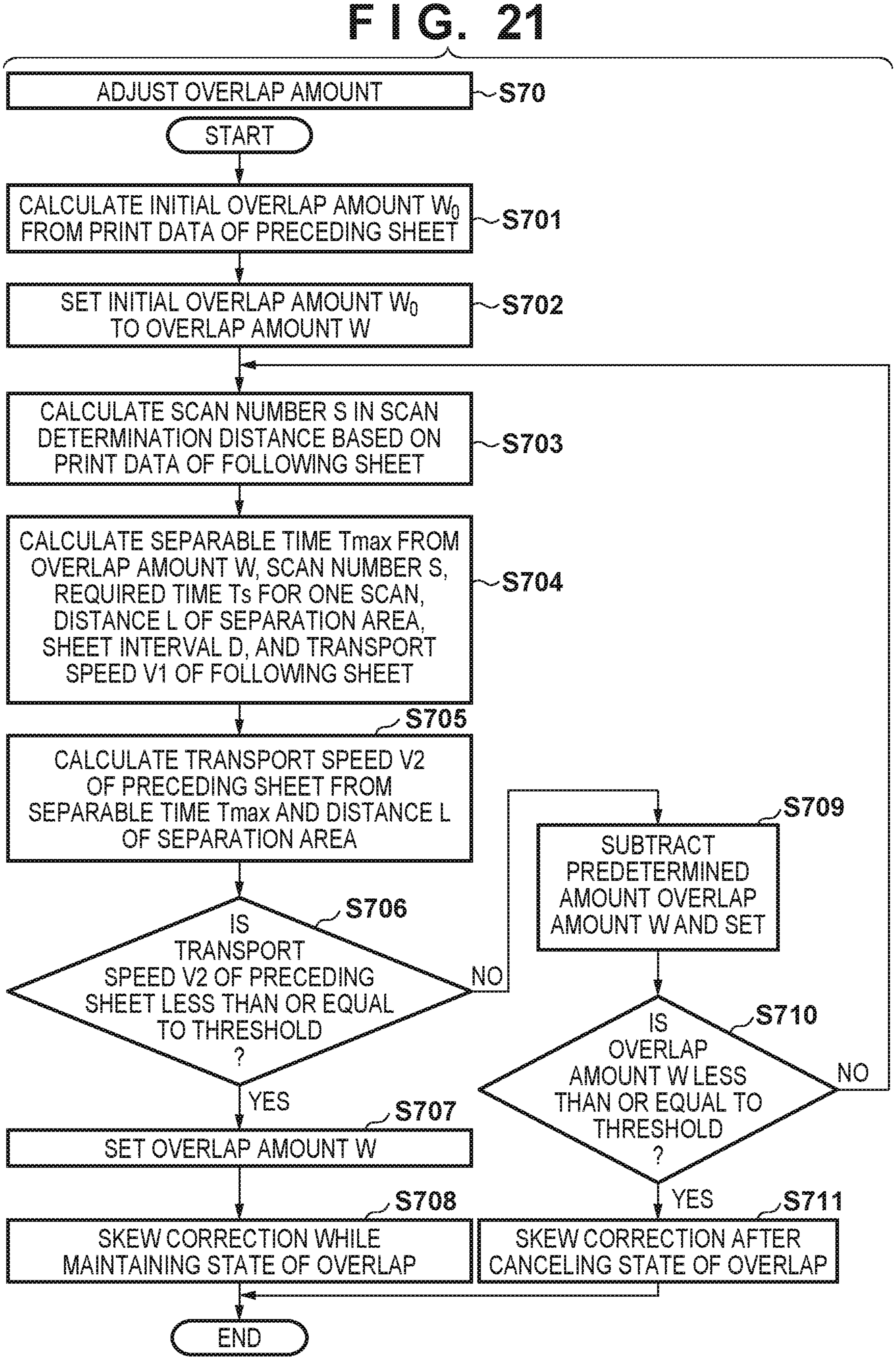
FIG. 21 is a flowchart illustrating overlap amount adjustment operations according to the first embodiment.

FIG. 21 is a control flowchart illustrating the overlap amount adjustment operations.

In step S701 of the overlap amount adjustment operations of step S70, the MPU 201 calculates an initial overlap amount W0 from the print data to be printed onto the preceding print medium P, and sets the initial overlap amount W0 for the overlap amount W in step S702 (the initial overlap amount calculation means 301). In step S703, the MPU 201 calculates the scan number S for the period when the downstream-side end part of the following print medium P in the transport direction traverses the scan determination distance (L−W−Dp), based on the print data printed onto the following print medium P.

In step S704, the MPU 201 calculates a separable time Tmax. The separable time Tmax is calculated, through the following formula, based on the overlap amount W, the scan number S, a required time Ts for one scan, the distance L of the separation area, the sheet interval Dp after the separation operations, and a transport speed V1 of the following print medium P.

$$T\max=(L-W-Dp)/V1+STs$$

In this formula, the first term (L−W−Dp)/V1 on the right side is the transport time of the following print medium P, and the second term STs on the right side is the transport stop time of the following print medium P. The separable time Tmax is the sum of the transport time and the transport stop time.

The transport speed V1 of the following print medium P is, in the present embodiment, the transport speed of the second transport roller 10. Note that the required time Ts for one scan is the length of time required for the carriage 1 to perform the scan operation indicated in the timing chart in FIG. 25. The required time Ts may include standby time before and after the operations, acceleration/deceleration time, and the like. The transport time calculation means 302 calculates the time for which the following second print medium Pis transported based on the distance L of the separation area, the overlap amount W, the sheet interval Dp after the separation operations, and the transport speed V1. The transport stop time calculation means 303 calculates the time for which the first transport roller 5 stops the transport of the following second print medium P based on the scan number S and the required time Ts for one scan.

In step S705, the MPU 201 calculates a speed V2 of the preceding print medium P for the separation operations (the transport speed calculation means 304). This is calculated through the following formula, based on the separable time Tmax and the distance L of the separation area.

$$V2=L/T\max$$

In step S706, the MPU 201 determines whether the speed V2 of the preceding print medium P is less than or equal to a threshold. This is the transport speed of the third transport roller 20 in the present embodiment. If the speed V2 is determined to be less than or equal to the threshold (step S706: YES), the processing moves to step S707 (the overlap amount determination means 307). In step S707, the MPU 201 sets the overlap amount W in the RAM 203, and the processing moves to step S708.

In step S708, the skew correction operations are performed for the following print medium P while maintaining the state of overlap, and the MPU 201 then determines the operations for cueing. In other words, the following print medium P is brought into contact with the transport nip part while remaining overlapped with the preceding print medium P after the image forming operations for the preceding print medium P are complete. Specifically, the first transport roller 5 and the feed roller 3 are rotated by driving the second feed motor 207 at the same time as the transport motor 205. After the skew correction operations, cueing is performed with the following print medium P remaining in a state of overlap on the preceding print medium P.

If in step S706 the speed V2 is determined to be greater than the threshold (step S706: NO), the processing moves to step S709.

In step S709, the MPU 201 subtracts a predetermined amount from the set overlap amount W and once again sets the overlap amount W in the RAM 203, after which the processing moves to step S710. For example, the amount may be reduced every 1 mm, or may be reduced every 2 mm. In step S710, the MPU 201 determines whether the overlap amount W between the following end part of the preceding print medium P and the leading end part of the following print medium P is less than or equal to a threshold. If it is determined that the overlap amount W is less than or equal to the threshold (step S710: YES), the MPU 201 determines to cancel the state of overlap and perform the skew correction operations only for the following print medium (step S711). In other words, the following print medium P is not transported with the preceding print medium P after the image forming operations for the preceding print medium P are complete. Specifically, the preceding print medium P is transported by the first transport roller 5 being driven by the transport motor 205. However, the feed roller 3 is not driven. The state of overlap is canceled as a result. Furthermore, the skew correction operations are performed by bringing only the following print medium P into contact with the transport nip part, and the cueing is then performed for only the following print medium P.

If in step S710 the overlap amount W is determined to be greater than the threshold (step S710: NO), the processing returns to step S703, where the MPU 201 calculates the scan number S in the scan determination distance based on the print data to be printed onto the following print medium P at the reduced overlap amount W.

Operations for adjusting the overlap amount between the first print medium P and the second print medium P will be described with reference to FIG. 26.

Figure 26:
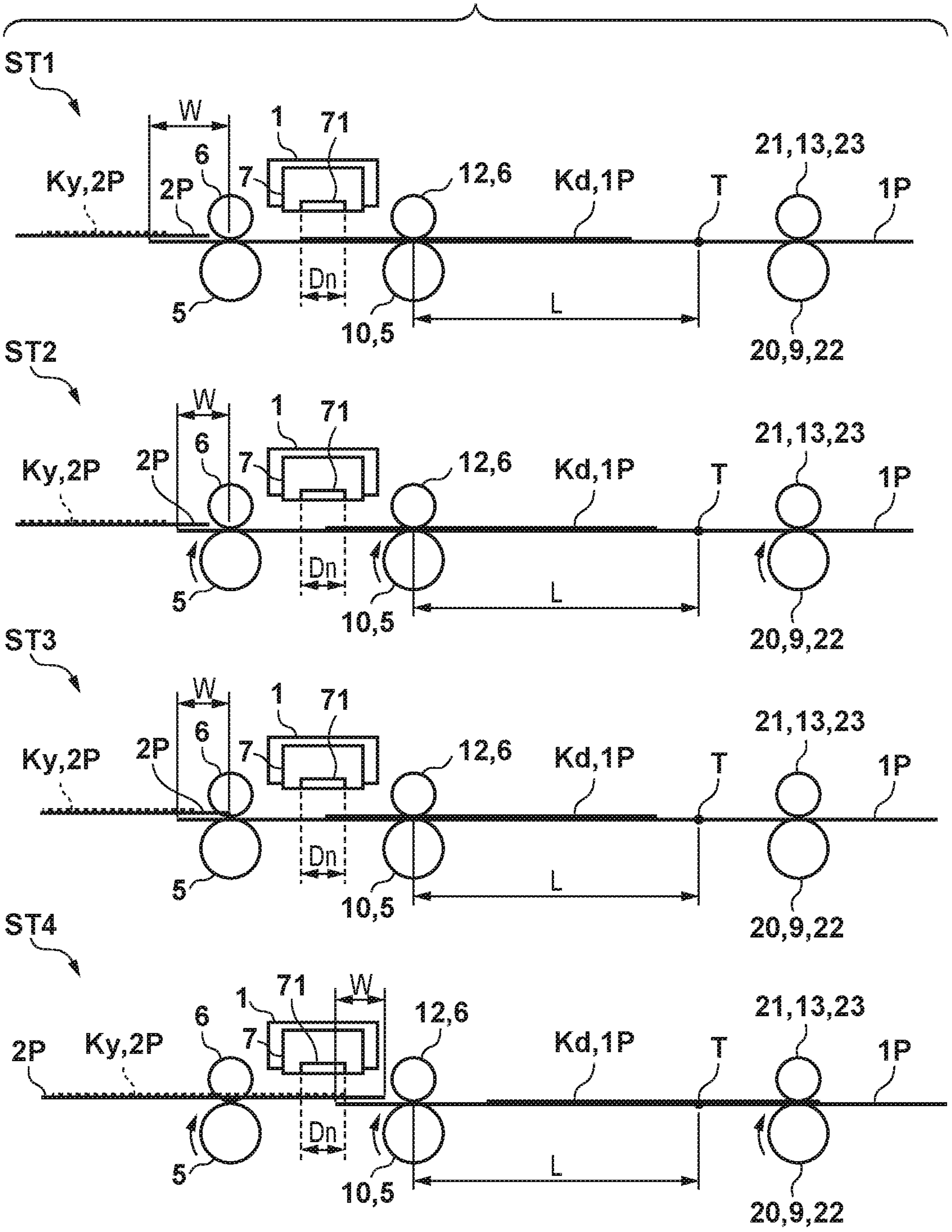
FIG. 26 is a diagram illustrating overlap amount adjustment operations.

ST1 in FIG. 26 indicates a state in which the image forming operations for the final line of the first print medium 1P have been completed in step S409 of FIG. 14A. At this time, the upstream-side end part of the first print medium 1P in the transport direction is located upstream from the first transport roller 5 by W0. In other words, if skew correction operations for the second print medium 2P are performed in this state, the first print medium 1P and the second print medium 2P will overlap by the initial overlap amount W0. In FIG. 26, Ky indicates the planned printing area on the print medium P, and Kd indicates the printed area. Additionally, Dn indicates a nozzle area distance, which is the distance of an area of ejection nozzles 71 provided in the print head 7 from the furthest upstream to the furthest downstream, i.e., a maximum printing width during printing. Accordingly, if the printing width for each scan operation of the carriage 1 is represented by Ds, Ds≤Dn. Additionally, the printing width need not be constant, and may instead differ from scan operation to scan operation.

As indicated by ST2 in FIG. 26, when the image forming operations for the final line of the first print medium IP end, the MPU transports only the first print medium 1P by rotating the first transport roller 5 a predetermined amount (step S410 in FIG. 14A). At this time, the MPU 201 rotates the first transport roller 5 to transport the first print medium IP until the upstream-side end part thereof in the transport direction reaches the position of the overlap amount W set in step S707 in FIG. 21 from the position upstream by W0 (step S411 in FIG. 14A). Once the print medium has been transported to the position of the overlap amount W, the MPU 201 stops the first transport roller 5 (step S412 in FIG. 14A).

ST3 in FIG. 26 indicates a state in which skew correction is being performed on the second print medium 2P in step S308 in FIG. 13A. As described with reference to ST6 in FIG. 6, when the first transport roller 5 is stopped in the image forming operations for the final line of the first print medium 1P, the skew correction operations for the second print medium 2P are performed to cause the leading end of the second print medium 2P to contact the transport nip part. At this time, the first print medium IP and the second print medium 2P overlap by an overlap amount W.

ST4 in FIG. 26 indicates a state in which cueing is being performed on the second print medium 2P in step S309 in FIG. 13A. The second print medium P is cued by the MPU 201 rotating the first transport roller 5 by a predetermined amount and keeping the second print medium 2P in a state of overlap on the first print medium 1P by the overlap amount W. In the present embodiment, the cueing is performed such that the furthest downstream part of a planned printing area Ky of the second print medium P coincides with the furthest downstream ejection nozzle of the print head 7.

In this manner, operations are performed to adjust the overlap amount between the preceding first print medium IP and the following second print medium 2P, Note that the skew correction for only the following print medium (steps S103 and S106 in FIG. 20) and the skew correction after canceling the state of overlap (steps S108, S110 and S112 in FIG. 20, and step S711 in FIG. 21) correspond to the series of processes of steps S404 to S407 and S308 in FIGS. 13 to 15. Likewise, the skew correction performed while maintaining the state of overlap (step S708 in FIG. 21) corresponds to the series of processes of steps S403, S408 to S412, and S308 in FIGS. 13 to 15.

Configuration for Calculating Leading End Position after Cueing

Figure 22:
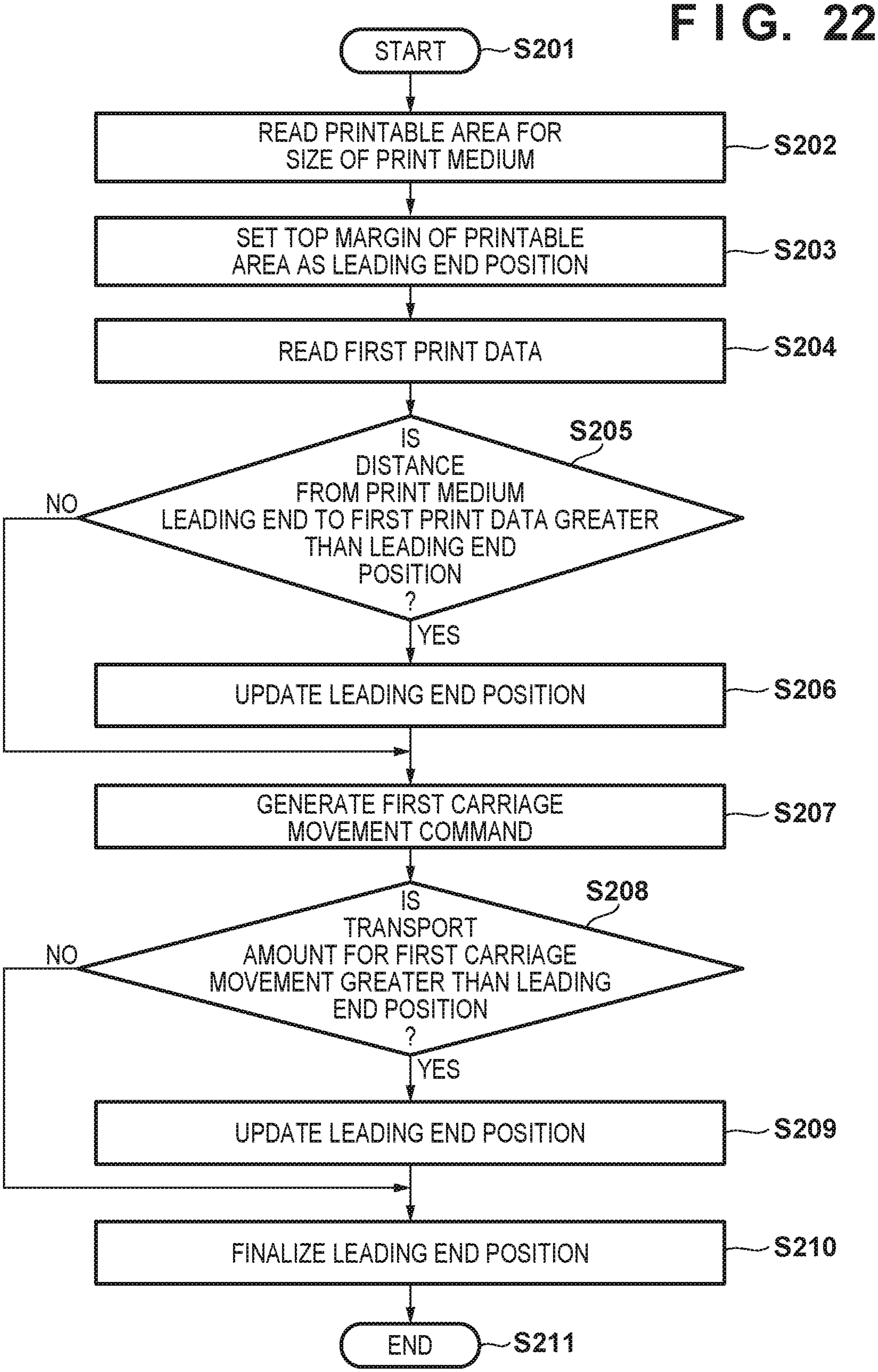
FIG. 22 is a flowchart illustrating operations for calculating a leading end position for a following sheet.

FIG. 22 is a flowchart illustrating operations for calculating the leading end position after cueing the following print medium according to the present embodiment.

The processing starts at step S201. In step S202, a printable area for the size of the print medium is read. The uppermost printable position, i.e., the top margin, is identified, and thus the top margin of the printable area is set as the leading end position (step S203). Here, the leading end position is defined as a distance from the transport nip part.

The first print data is then read (step S204). This identifies to which position from the leading end of the print medium the first print data corresponds (detects a non-printing area), and it is therefore determined whether the distance from the leading end of the print medium to the first print data is greater than the leading end position which has been set (step S205). If the distance from the leading end of the print medium to the first print data is greater than the leading end position which has been set (step S205: YES), the leading end position is updated to the distance from the leading end of the print medium to the first print data (step S206). However, if the distance from the leading end of the print medium to the first print data is not greater than the leading end position which has been set (step S205: NO), the processing moves to step S207.

Next, a first carriage movement command is generated (step S207). It is determined whether the transport amount of the print medium for the first carriage movement is greater than the leading end position which has been set (step S208). If the transport amount of the print medium for the first carriage movement is greater than the leading end position which has been set (step S208: YES), the leading end position is updated to the transport amount of the print medium for the first carriage movement (step S209). If the transport amount of the print medium for the first carriage movement is not greater than the leading end position which has been set (step S208: NO), the leading end position is not updated. As described thus far, the leading end position of the following print medium Pis finalized (step S210), and the processing then ends (step S211). Whether the following print medium P will reach the spur (not shown) when the following print medium P is cued can be determined (FIG. 20: step S109) based on the finalized leading end position.

As described thus far, according to the foregoing embodiment, the transport speed of a preceding print medium is reduced when performing operations for separating the preceding print medium from a following print medium to cancel a state of overlap, which makes it possible to suppress an increase in noise, power consumption, and the like.

Second Embodiment

Figure 23:
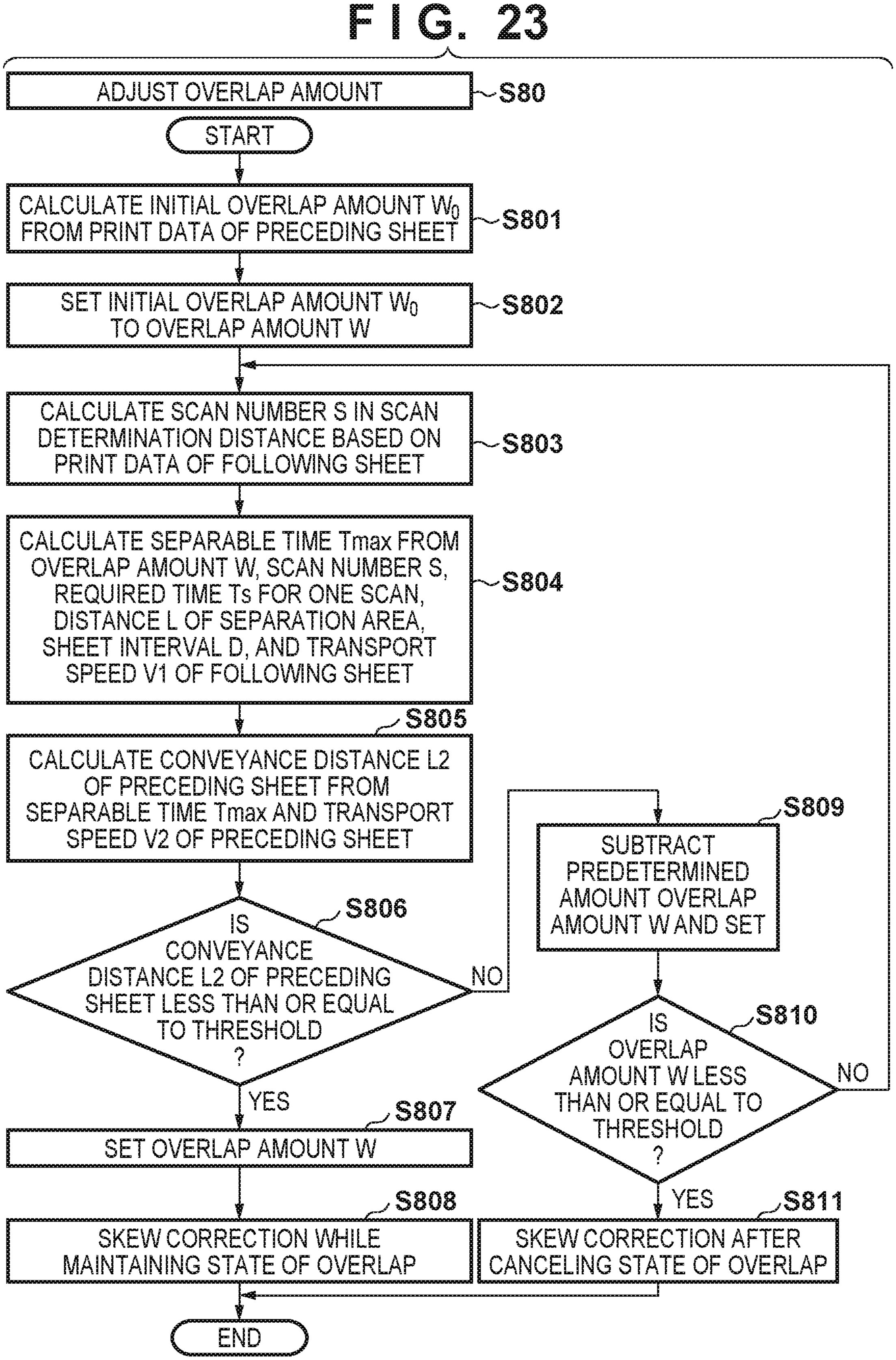
FIG. 23 is a flowchart illustrating overlap amount adjustment operations according to a second embodiment.

The first embodiment described a case where whether to adjust the overlap amount is determined by calculating the transport speed of the preceding print medium. The present embodiment, however, will describe an example in which whether to adjust the overlap amount is determined by calculating a transport distance of the preceding print medium, with reference to FIG. 23. Steps S801 to S804 are similar to steps S701 to S704 in FIG. 21, described in the first embodiment, and will therefore not be described.

In step S805, the MPU 201 calculates a transport distance L2 of the preceding print medium P for the separation operations (the transport distance calculation means 305). This is calculated through the following formula, based on the separable time Tmax and the transport speed V2 of the preceding print medium.

$$L2 = V2 \times T\max$$

In step S806, the MPU 201 determines whether the transport distance L2 of the preceding print medium P is at least a threshold (the overlap amount determination means 307). If the transport distance L2 is determined to be at least the threshold (step S806: YES), the processing moves to step S807. In step S807, the MPU 201 sets the overlap amount W in the RAM 203, and the processing moves to step S808.

In step S808, the skew correction operations are performed for the following print medium P while maintaining the state of overlap, and the MPU 201 then determines the operations for cueing. In other words, the following print medium P is brought into contact with the transport nip part while remaining overlapped with the preceding print medium P after the image forming operations for the preceding print medium P are complete. Specifically, the first transport roller 5 and the feed roller 3 are rotated by driving the second feed motor 207 at the same time as the transport motor 205. After the skew correction operations, cueing is performed with the following print medium P remaining in a state of overlap on the preceding print medium P.

If in step S806 the transport distance L2 is determined to be lower than the threshold (step S806: NO), the processing moves to step S809.

In step S809, the MPU 201 subtracts a predetermined amount from the set overlap amount W and once again sets the overlap amount W in the RAM 203, after which the processing moves to step S810. For example, the amount may be reduced every 1 mm, or may be reduced every 2 mm.

In step S810, the MPU 201 determines whether the overlap amount W between the following end part of the preceding print medium P and the leading end part of the following print medium P is less than or equal to a threshold. If it is determined that the overlap amount W is less than or equal to the threshold (step S810: YES), the MPU 201 determines to cancel the state of overlap and perform the skew correction operations only for the following print medium (step S811). In other words, the following print medium P is not transported with the preceding print medium P after the image forming operations for the preceding print medium P are complete. Specifically, the preceding print medium P is transported by the first transport roller 5 being driven by the transport motor 205. However, the feed roller 3 is not driven. The state of overlap is canceled as a result. Furthermore, the skew correction operations are performed by bringing only the following print medium P into contact with the transport nip part, and the cueing is then performed for only the following print medium P.

If in step S810 the overlap amount W is determined to be greater than the threshold (step S810: NO), the processing returns to step S803, where the MPU 201 calculates the scan number S in the scan determination distance based on the print data to be printed onto the following print medium P at the reduced overlap amount W.

As described thus far, when performing operations for separating a preceding print medium from a following print medium to cancel a state of overlap, an increase in noise, power consumption, and the like can be suppressed while suppressing the transport speed of the preceding print medium.

Third Embodiment

Figure 24:
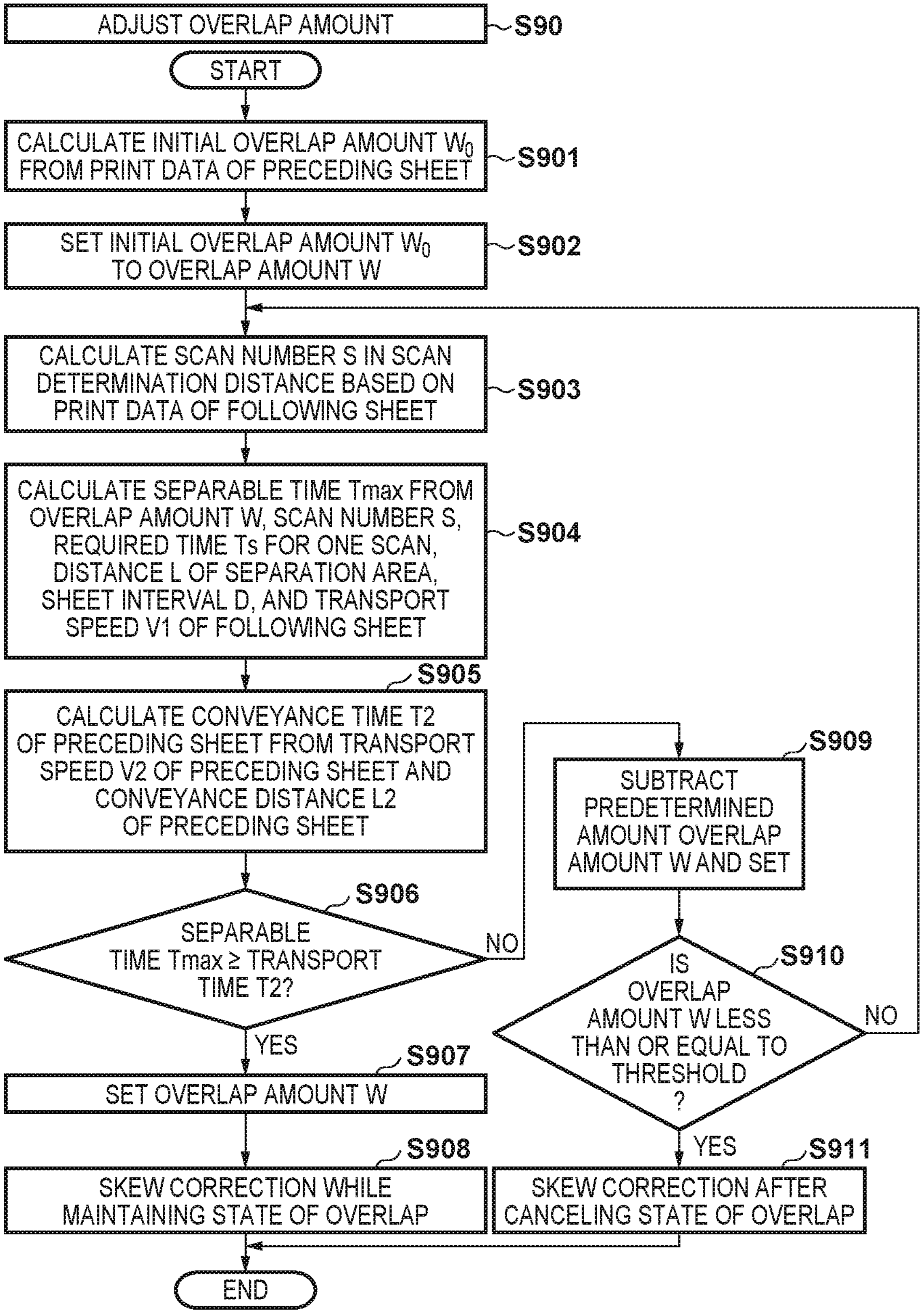
FIG. 24 is a flowchart illustrating overlap amount adjustment operations according to a third embodiment.

The first embodiment described a case where whether to adjust the overlap amount is determined by calculating the transport speed of the preceding print medium. The present embodiment, however, will describe an example in which whether to adjust the overlap amount is determined by calculating the transport time of the preceding print medium, with reference to FIG. 24. Steps S901 to S904 are similar to steps S701 to S704 in FIG. 21, described in the first embodiment, and will therefore not be described.

In step S905, the MPU 201 calculates a transport time T2 of the preceding print medium P for the separation operations (the transport time calculation means 306). This is calculated through the following formula, based on the transport distance L2 of the preceding print medium and the transport speed V2 of the preceding print medium.

$$T2 = L2 / V2$$

In step S906, the MPU 201 determines whether the transport time T2 of the preceding print medium P is less than or equal to the separable time Tmax (the overlap amount determination means 307). If the transport time T2 is determined to be less than or equal to the separable time Tmax (step S906: YES), the processing moves to step S907. In step S907, the MPU 201 sets the overlap amount W in the RAM 203, and the processing moves to step S908.

In step S908, the skew correction operations are performed for the following print medium P while maintaining the state of overlap, and the MPU 201 then determines the operations for cueing. In other words, the following print medium P is brought into contact with the transport nip part while remaining overlapped with the preceding print medium P after the image forming operations for the preceding print medium P are complete. Specifically, the first transport roller 5 and the feed roller 3 are rotated by driving the second feed motor 207 at the same time as the transport motor 205. After the skew correction operations, cueing is performed with the following print medium P remaining in a state of overlap on the preceding print medium P.

If in step S906 the transport time T2 is determined to be greater than the separable time Tmax (step S906: NO), the processing moves to step S909.

In step S909, the MPU 201 subtracts a predetermined amount from the set overlap amount W and once again sets the overlap amount W in the RAM 203, after which the processing moves to step S910. For example, the amount may be reduced every 1 mm, or may be reduced every 2 mm. In step S910, the MPU 201 determines whether the overlap amount W between the following end part of the preceding print medium P and the leading end part of the following print medium P is less than or equal to a threshold. If it is determined that the overlap amount W is less than or equal to the threshold (step S910: YES), the MPU 201 determines to cancel the state of overlap and perform the skew correction operations only for the following print medium (step S911). In other words, the following print medium P is not transported with the preceding print medium P after the image forming operations for the preceding print medium P are complete. Specifically, the preceding print medium P is transported by the first transport roller 5 being driven by the transport motor 205. However, the feed roller 3 is not driven. The state of overlap is canceled as a result. Furthermore, the skew correction operations are performed by bringing only the following print medium P into contact with the transport nip part, and the cueing is then performed for only the following print medium P.

If in step S910 the overlap amount W is determined to be greater than the threshold (step S910: NO), the processing returns to step S903, where the MPU 201 calculates the scan number S in the scan determination distance based on the print data to be printed onto the following print medium P at the reduced overlap amount W.

As described thus far, when performing operations for separating a preceding print medium from a following print medium to cancel a state of overlap, an increase in noise, power consumption, and the like can be suppressed while suppressing the transport speed of the preceding print medium.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042782, filed Mar. 17, 2022, which is hereby incorporated by reference herein in its entirety.

What is claimed is:

1. A printing apparatus comprising:
a supply unit configured to supply a print medium;
a first roller configured to transport the print medium, supplied by the supply unit, in a transport direction;
a printing unit configured to print on the print medium transported by the first roller;
a second roller disposed downstream from the printing unit and configured to transport the print medium transported by the first roller; and
a control unit capable of controlling the supply unit and the first roller to create a state of overlap in which a leading end part of a following print medium overlaps a following end part of a preceding print medium on an upstream side of the first roller with respect to the transport direction of the print medium,
wherein the control unit changes an overlap amount in the state of overlap on the upstream side of the first roller with respect to the transport direction of the print medium based on print data for the preceding print medium and print data for the following print medium, and after changing the overlap amount, the preceding print medium and the following print medium are separated between the first roller and the second roller.

2. The printing apparatus according to claim 1, further comprising:
a third roller disposed between the first roller and the second roller with respect to the transport direction,
wherein the preceding print medium and the following print medium are separated between the second roller and the third roller.

3. The printing apparatus according to claim 1,
wherein the control unit calculates an initial overlap amount from the print data for the preceding print medium, and changes the overlap amount to be shorter than the initial overlap amount.

4. The printing apparatus according to claim 1,
wherein the control unit calculates a transport time for which the first roller is driven based on the print data for the following print medium in a predetermined section, and changes the overlap amount according to the transport time calculated.

5. The printing apparatus according to claim 4,
wherein the control unit calculates a transport stop time for which the first roller is stopped based on the print data for the following print medium in the predetermined section, and changes the overlap amount according to the transport stop time calculated.

6. The printing apparatus according to claim 5, wherein the control unit calculates the transport time and the transport stop time based on print data printed during transport over a distance set in advance from a position obtained when a leading end of the following print medium is transported by the overlap amount from the first roller or the second roller.

7. The printing apparatus according to claim 6, wherein the control unit determines a transport speed of the preceding print medium based on the transport time and the transport stop time.

8. The printing apparatus according to claim 7, wherein the control unit changes the overlap amount to be shorter when the transport speed of the preceding print medium is determined to be higher than a threshold.

9. The printing apparatus according to claim 5, wherein the control unit determines a transport distance of the preceding print medium based on the transport time and the transport stop time.

10. The printing apparatus according to claim 9, wherein the control unit changes the overlap amount to be shorter when the transport distance of the preceding print medium is determined to be shorter than a threshold.

11. The printing apparatus according to claim 5, wherein the control unit determines the transport time of the preceding print medium based on the transport distance and the transport speed of the preceding print medium.

12. The printing apparatus according to claim 11, wherein the control unit changes the overlap amount to be shorter when the transport time of the preceding print medium is determined to be longer than a sum of the transport time and the transport stop time.

13. The printing apparatus according to claim 1, wherein the control unit changes the overlap amount to be shorter by transporting the preceding print medium after image formation for a final line of the preceding print medium is performed.

14. A method of controlling a printing apparatus, the printing apparatus including a supply unit configured to supply a print medium, a first roller configured to transport the print medium, supplied by the supply unit, in a transport direction, a printing unit configured to print on the print medium transported by the first roller, and a second roller disposed downstream from the printing unit and configured to transport the print medium transported by the first roller, the method comprising:

controlling the supply unit and the first roller to create a state of overlap in which a leading end part of a following print medium overlaps a following end part of a preceding print medium on an upstream side of the first roller with respect to the transport direction of the print medium, wherein in the controlling, an overlap amount in the state of overlap is changed on the upstream side of the first roller with respect to the transport direction of the print medium based on print data for the preceding print medium and print data for the following print medium, and after changing the overlap amount, the preceding print medium and the following print medium are separated between the first roller and the second roller.

15. A non-transitory computer-readable storage medium in which is stored a program that causes a computer to execute a method of controlling a printing apparatus, the printing apparatus including a supply unit configured to supply a print medium, a first roller configured to transport the print medium, supplied by the supply unit, in a transport direction, a printing unit configured to print on the print medium transported by the first roller, and a second roller disposed downstream from the printing unit and configured to transport the print medium transported by the first roller, the method comprising:

controlling the supply unit and the first roller to create a state of overlap in which a leading end part of a following print medium overlaps a following end part of a preceding print medium on an upstream side of the first roller with respect to the transport direction of the print medium, wherein in the controlling, an overlap amount in the state of overlap is changed on the upstream side of the first roller with respect to the transport direction of the print medium based on print data for the preceding print medium and print data for the following print medium, and after changing the overlap amount, the preceding print medium and the following print medium are separated between the first roller and the second roller.

* * * * *